US 12,361,034 B1

(12) United States Patent
Tang et al.

(10) Patent No.: US 12,361,034 B1
(45) Date of Patent: *Jul. 15, 2025

(54) SYSTEMS AND METHODS OF ESTABLISHING CORRELATIVE RELATIONSHIPS BETWEEN GEOSPATIAL DATA FEATURES IN FEATURE VECTORS REPRESENTING PROPERTY LOCATIONS

(71) Applicant: Federal Home Loan Mortgage Corporation (Freddie Mac), McLean, VA (US)

(72) Inventors: Yuang Tang, Baltimore, MD (US); Fabio Quijada, Reston, VA (US); Jianglong Li, McLean, VA (US)

(73) Assignee: FEDERAL HOME LOAN MORTGAGE CORPORATION (FREDDIE MAC), McLean, VA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/648,854

(22) Filed: Apr. 29, 2024

Related U.S. Application Data

(63) Continuation of application No. 17/987,499, filed on Nov. 15, 2022, now Pat. No. 11,983,203, which is a
(Continued)

(51) Int. Cl.
*G06F 16/00* (2019.01)
*G06F 16/2457* (2019.01)
(Continued)

(52) U.S. Cl.
CPC ........ *G06F 16/29* (2019.01); *G06F 16/24573* (2019.01); *G06F 16/2465* (2019.01);
(Continued)

(58) Field of Classification Search
CPC .............. G06F 16/29; G06F 16/24573; G06F 16/2465; G06F 16/248; G06F 16/288; G06N 20/00; G06Q 50/16
See application file for complete search history.

(56) References Cited

U.S. PATENT DOCUMENTS

| 11,562,007 B1 | 1/2023 | Tang et al. | |
| 2011/0270779 A1* | 11/2011 | Showalter | G06Q 40/02 705/36 R |

(Continued)

OTHER PUBLICATIONS

U.S. Appl. No. 16/394,657, filed Apr. 25, 2019, Patented.
(Continued)

*Primary Examiner* — Alexander Khong
(74) *Attorney, Agent, or Firm* — Finch & Maloney PLLC

(57) ABSTRACT

In an illustrative embodiment, systems and methods include storing, to feature vectors of real estate properties, both property attributes and at least one geospatial feature located within a predetermined distance of the property's location, evaluating, using machine learning (ML) algorithm(s), subsets of properties to identify impactful features having a significant impact on property value for each property subset, and, using an ML model trained for the impactful features of a given property subset, analyze feature data to obtain a) a set of similar properties and/or b) a property valuation for each of one or more real estate properties.

20 Claims, 12 Drawing Sheets

Related U.S. Application Data continuation of application No. 16/394,657, filed on Apr. 25, 2019, now Pat. No. 11,562,007.

(51) Int. Cl.
| | | |
|---|---|---|
| G06F 16/2458 | (2019.01) | |
| G06F 16/248 | (2019.01) | |
| G06F 16/28 | (2019.01) | |
| G06F 16/29 | (2019.01) | |
| G06N 20/00 | (2019.01) | |
| G06Q 50/16 | (2012.01) | |

(52) U.S. Cl.
CPC .......... *G06F 16/248* (2019.01); *G06F 16/288* (2019.01); *G06N 20/00* (2019.01); *G06Q 50/16* (2013.01)

(56) References Cited

U.S. PATENT DOCUMENTS

| | | | |
|---|---|---|---|
| 2012/0084657 | A1 | 4/2012 | Ranade et al. |
| 2015/0026088 | A1 | 1/2015 | Alber et al. |
| 2015/0356099 | A1 | 12/2015 | Targonski et al. |
| 2016/0216122 | A1 | 7/2016 | Borgerson et al. |
| 2017/0236226 | A1 | 8/2017 | Malaviya et al. |
| 2017/0330231 | A1 | 11/2017 | Wayne et al. |
| 2017/0364733 | A1* | 12/2017 | Estrada .................. G06V 20/13 |
| 2020/0342474 | A1 | 10/2020 | Cranshaw et al. |

OTHER PUBLICATIONS

U.S. Appl. No. 17/987,499, filed Nov. 15, 2022, Pending.

Nicholas Foran, Bay Area Walk Score Premiums—Unlocking Value Through Neighborhood Trends, B.S., Architecturla Engineering, 2009. 48 pages.

Miguel Martinez Villarrel, "Economic Value of Walkablity," Academia, Victoria Transport Policy Institute, Apr. 20, 2017. 32 pages.

John Gilderbloom et al, "Does walkablity matter? An examination of walkablity's impact on housing values, forclosures, and crime," Elsevier, vol. 42, Part A, Feb. 2015. pp. 13-24.

Gary Pivo and Jeffery Fisher, The Walkablity Premium in Commercial Real Estate Investments, American Real Estate and Urban Economics Association, 2011. 35 pages.

Stephanie Yates Rauterkus and Norman Miller, Residential Land Values and Walkability, Journal of Sustainable Real Estate, vol. 3. No. 1—2011. 22 pages.

Eun Kim and Hyunjung Kim, Neighborhood Walkablity and Housing prices: A Correlation Study, Sustainability 2020, vol. 12, 593. 18 pages.

Joe Cortright, "Walking the Walk—How Walkabilty Raises Home Values in U.S. cities," CEOs for Cities, Aug. 2009. 34 pages.

Sherwin Rosen, "Hedonic Prices and Implicit Markets: Product Differentiation in Pure Competition," Journal of Political Economy, 1974. 55 pages.

* cited by examiner

| GIS ID | Feature Location | Tags | Type | Distance | Closest Point |
|---|---|---|---|---|---|
| 312 | LINESTRING(Lat/Long1-4) | {highway, residential, name, "Southwest 53rd Street"} | Line | Distance1 | Point(Lat/Long3) |
| 314 | LINESTRING(Lat/Long5-8) | {highway, residential, name, "Southwest 53rd Lane"} | Line | Distance2 | Point(Lat/Long6) |
| 316 | LINESTRING(Lat/Long9-12) | {highway, residential, name, "Southwest 69th Place"} | Line | Distance3 | Point(Lat/Long10) |
| 318 | LINESTRING(Lat/Long13-16) | {railway, abandoned, name, -} | Line | Distance4 | Point(Lat/Long13) |
| 320 | LINESTRING(Lat/Long17-20) | {highway, residential, name, "Southwest 52nd Street"} | Line | Distance5 | Point(Lat/Long20) |
| 322 | LINESTRING(Lat/Long21-24) | {highway, residential, name, "Southwest 52th Street"} | Line | Distance6 | Point(Lat/Long21) |
| 324 | LINESTRING(Lat/Long25-28) | {highway, residential, name, "Southwest 69th Lane"} | Line | Distance7 | Point(Lat/Long27) |
| 326 | LINESTRING(Lat/Long29-32) | {highway, residential, name, "Southwest 69th Avenue"} | Line | Distance8 | Point(Lat/Long29) |
| 328 | LINESTRING(Lat/Long33-36) | {highway, residential, name, "Southwest 53rd Lane"} | Line | Distance9 | Point(Lat/Long33) |
| 330 | POLYGON(Lat/Long37-40) | {boundary, cenus, place, locality, name, "Glenvar Heights"} | Poly | Distance10 | Point(Lat/Long38) |
| 332 | POLYGON(Lat/Long41-44) | {natural, water} | Poly | Distance11 | Point(Lat/Long44) |
| 334 | POLYGON(Lat/Long45-48) | {amenity, school, name, "South Miami Senior High School"} | Poly | Distance12 | Point(Lat/Long48) |

FIG. 3

SYSTEMS AND METHODS OF ESTABLISHING CORRELATIVE RELATIONSHIPS BETWEEN GEOSPATIAL DATA FEATURES IN FEATURE VECTORS REPRESENTING PROPERTY LOCATIONS

RELATED APPLICATIONS

This application claims priority to and is a continuation of U.S. patent application Ser. No. 17,987,499 entitled "Systems and Methods of Establishing Correlative Relationships Between Geospatial Data Features in Feature Vectors Representing Property Locations," filed Nov. 15, 2022, which is a continuation of U.S. patent application Ser. No. 16/394,657, entitled "Systems and Methods of Establishing Correlative Relationships Between Geospatial Data Features in Feature Vectors Representing Property Locations," filed Apr. 25, 2019 (Now U.S. Pat. No. 11,562,007). Each of the above identified applications is hereby incorporated by reference in its entirety.

SUMMARY OF ILLUSTRATIVE EMBODIMENTS

The present inventors have determined a need for accurately and efficiently performing market assessments of property values that are not subject to the inconsistencies and biases of manually performed market assessments. The implementations described herein present computing systems and methods for automating market assessments by engineering customized feature vectors for property locations that incorporate geospatial information system (GIS) data features from GIS map sources and additional amplifying information for the GIS data features. From the engineered feature vectors for property locations, the computing systems described herein use machine learning algorithms to identify which features have the greatest impact on property values and make property value assessments based on the information contained in the feature vectors. The implementations described herein provide the benefit of increasing the scope of information that can be used by the system to determine which features impact property values, which removes the biases and inconsistencies that are inherent in human analysis. Further, the computing systems establish relationships between features within the feature vector based on computed distances from a property location to each of the GIS features within the feature vector. The relationships between the individual features within the feature vector allow the system to identify previously undiscovered features or groups of features that impact property values.

Conventional property valuation systems use repeat sales models or hedonic models when performing market assessments of properties, which can include property valuation. Repeat sales models base home valuation calculations on a ratio of property sale amounts at two points in time for at least one property that has similar characteristics (e.g., local market, zip code) to a property whose value is being calculated. Hedonic models base home valuation calculations on property attributes provided in property appraisals such as tax amounts, number of bedrooms and bathrooms, size of lot, and distance to city center. While these conventional models may provide some indication of property value, in many instances, they do not capture property features that are critical to determining an accurate property value. For example, two properties across the street from one another may have identical hedonic attributes but have drastically varying property values because one has a waterfront view and one does not have a waterfront view.

Further, manually performed property appraisals are subject to inaccuracies and inconsistencies from appraisers' incomplete knowledge and personal biases. For example, different appraisers may have different opinions regarding the quality of schools in a neighborhood, and their appraisals of homes in the neighborhood may be inconsistent because of their biases. Appraisers may also be unaware of the main factors that affect property values and may weigh some home features more or less heavily than they should, which also leads to inaccuracies in home appraisals. Also, appraisers and real estate professionals often select properties for a comparable market analysis due to their proximity to an assessed property and similar hedonic attributes (e.g., number of bedrooms and bathrooms, lot size, etc.). However, the selected comparable properties may not include some of the features of the assessed property that home buyers value the most. Additionally, determining home values in markets where volumes of home sales are low can be difficult because there may be few or no comparable properties.

In some embodiments, an automated system engineers customized feature vectors from geospatial information system (GIS) metadata. The system may include computing systems and devices for extracting metadata for GIS features located within a predetermined distance of a property from a GIS map file and storing the extracted GIS features within a feature vector. The system can augment each of the extracted GIS features with amplifying data features extracted from external data sources. The system can calculate a distance between the property and each extracted GIS feature, which establishes a relationship between the property and each GIS feature and associated amplifying data features. In some examples, amounts of correlation between each of the extracted GIS features and associated amplifying data features within the feature vector and a market assessment of the property location can be identified using a data model trained with a data set customized to characteristics of the property.

The preceding general description of the illustrative implementations and the following detailed description thereof are merely exemplary aspects of the teachings of this disclosure and are not restrictive.

BRIEF DESCRIPTION OF THE DRAWINGS

The accompanying drawings, which are incorporated in and constitute a part of the specification, illustrate one or more embodiments and, together with the description, explain these embodiments. The accompanying drawings have not necessarily been drawn to scale. Any values dimensions illustrated in the accompanying graphs and figures are for illustration purposes only and may or may not represent actual or preferred values or dimensions. Where applicable, some or all features may not be illustrated to assist in the description of underlying features. In the drawings:

FIG. 3 is a table of GIS features for an example property feature vector;

DETAILED DESCRIPTION OF ILLUSTRATIVE EMBODIMENTS

Figure 1:
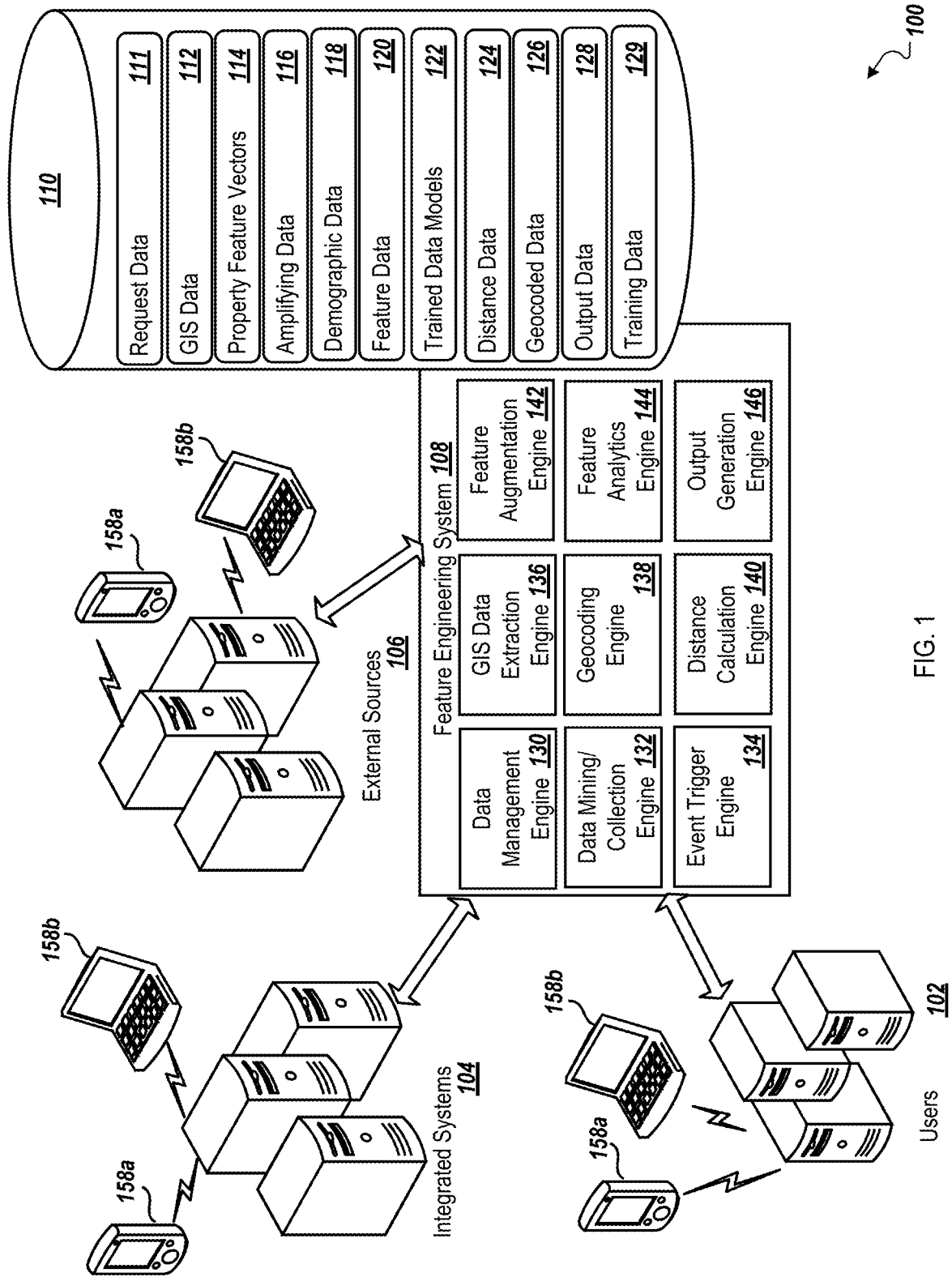
FIG. 1 is an example computing system including software engines in a system for engineering feature vectors for property locations.

The description set forth below in connection with the appended drawings is intended to be a description of various, illustrative embodiments of the disclosed subject matter. Specific features and functionalities are described in connection with each illustrative embodiment; however, it will be apparent to those skilled in the art that the disclosed embodiments may be practiced without each of those specific features and functionalities.

Reference throughout the specification to "one embodiment" or "an embodiment" means that a particular feature, structure, or characteristic described in connection with an embodiment is included in at least one embodiment of the subject matter disclosed. Thus, the appearance of the phrases "in one embodiment" or "in an embodiment" in various places throughout the specification is not necessarily referring to the same embodiment. Further, the particular features, structures or characteristics may be combined in any suitable manner in one or more embodiments. Further, it is intended that embodiments of the disclosed subject matter cover modifications and variations thereof.

It must be noted that, as used in the specification and the appended claims, the singular forms "a," "an," and "the" include plural referents unless the context expressly dictates otherwise. That is, unless expressly specified otherwise, as used herein the words "a," "an," "the," and the like carry the meaning of "one or more." Additionally, it is to be understood that terms such as "left," "right," "top," "bottom," "front," "rear," "side," "height," "length," "width," "upper," "lower," "interior," "exterior," "inner," "outer," and the like that may be used herein merely describe points of reference and do not necessarily limit embodiments of the present disclosure to any particular orientation or configuration. Furthermore, terms such as "first," "second," "third," etc., merely identify one of a number of portions, components, steps, operations, functions, and/or points of reference as disclosed herein, and likewise do not necessarily limit embodiments of the present disclosure to any particular configuration or orientation.

Furthermore, the terms "approximately," "about," "proximate," "minor variation," and similar terms generally refer to ranges that include the identified value within a margin of 20%, 10% or preferably 5% in certain embodiments, and any values therebetween.

All of the functionalities described in connection with one embodiment are intended to be applicable to the additional embodiments described below except where expressly stated or where the feature or function is incompatible with the additional embodiments. For example, where a given feature or function is expressly described in connection with one embodiment but not expressly mentioned in connection with an alternative embodiment, it should be understood that the inventors intend that the feature or function may be deployed, utilized or implemented in connection with the alternative embodiment unless the feature or function is incompatible with the alternative embodiment.

Aspects of the present disclosure are directed to systems and methods of identifying and labeling properties with exogenous environmental and locational features from geospatial information system (GIS) data sources. In some implementations, a feature engineering system identifies targeted geospatial features within GIS metadata that can be used to make more accurate and efficient market assessments of properties than using conventional home valuation models. In some examples, the feature engineering system extracts metadata features from GIS data sources, augments the extracted features with amplifying data, and uses the extracted features to make property value determinations, identify comparable properties to a given property, and automate property appraisals. For example, one of the identified GIS metadata features may be a location of the nearest high school and its distance to a particular property. The system, in some implementations, may augment the high school data in a feature vector for the property with quality rating data for the high school obtained from a school ratings website. By automatically detecting and incorporating GIS metadata and associated amplifying information into a feature vector for a property, the system, using machine learning techniques, can determine which features have a strongest correlative effect on a market assessment of the property and use those features to accurately determine the property value.

Additionally, the feature engineering system, using continuously updated training data for a machine learning algorithm, can determine which geospatial features have a largest correlative impact on property value and also identify additional features that have an impact that were previously unknown to property appraisers, real estate professionals, insurance underwriters, and other industry experts. In one example, the system may incorporate amplifying information from weather websites and data sources that provide seasonal sun and shade information for different locations. By linking amplifying information regarding how much sun and shade a property gets in a day or throughout the year, the system can determine whether the amount of sun the property is exposed to has an impact on the value of the property.

The implementations of the present disclosure provided herein are a significant improvement over manual, conventional methods of market assessment and property valuation and are necessarily rooted in computer technology. As discussed above, conventional home valuation techniques are limited to the localized perspectives and biases of human evaluators. The systems and methods of the present disclosure include detecting and extracting targeted GIS features from geospatial maps and organizing the GIS features into a property feature vectors. Further, the GIS features are augmented with amplifying information that is also incorporated into the property feature vectors, which allows trained data models to detect correlations between characteristics of the property and its surrounding area with the value of the property that are unobservable to humans and without the biases that humans interject into their assessments. Because each GIS feature in a property feature vector is linked to a property location by a distance value, the amplifying information is also linked to the property location, which can be used by the trained data models to determine correlations between the features and property values. Further, the trained data models that are used to determine property values are continuously retrained and refitted to reflect updates to property feature data so that the system is not subjected to knowledge lags that humans are often vulnerable to. Also, as the system processes updated data, the trained data models can discover new features and correlations between features that impact property value.

In some embodiments, the feature engineering system described herein employs an object-relationship data management system (ORDMS) with a spatial database extender to store GIS data. Because calculating distance to GIS features is computationally expensive, storing GIS data in an ORDMS allows the system employ targeted functions and syntaxes for calculating distances that are specific to GIS data and are more efficient than if the GIS data was stored in another database format. Therefore, the methodologies employed by the system to efficiently compute distances to GIS features represent yet another significant technological improvement.

FIG. 1 is a diagram of an example environment 100 for a feature engineering system 108. The diagram illustrates a series of interactions between one or more participants and devices in the feature engineering system 108, which is configured to identify and extract features from geospatial information system (GIS) data that affect property values, augment the extracted features with amplifying data, and use the extracted features to make market assessments. In some examples, the feature engineering system 108 can compute distances between each of the extracted features and a specific property, which can be organized into a property feature vector with the amplifying data. The engineered feature vector, in some embodiments, can be used to determine property values, identify comparable properties, and confirm or replace manually performed appraisals. Throughout the disclosure, the feature engineering system 108 is described with respect to residential properties but can also be used for determining values of commercial properties, parcels of land, and other types of properties.

In some examples, the feature engineering system 108 can determine property values without any manual inputs from appraisers or any hedonic model data (e.g., numbers of bedrooms/bathrooms, home square footage, property size). Further, in areas where real estate transactions are infrequent, it can be difficult for conventional models and methods to predict property values and identify accurate comparable properties. In these types of areas where there is seemingly incomplete or inconsistent information, the feature engineering system 108 can provide a fuller, more accurate picture of property features that impact value. For example, the feature engineering system 108 can automatically augment GIS feature data within the vicinity of a property with amplifying information pulled into the system 108 from a variety of external data sources. The system 108 can use the amplified GIS feature data to train data models with machine learning algorithms to determine how much of an impact each of the features has on property value.

Users 102, in some implementations, include computing devices and databases distributed across a widely dispersed network that may be distributed across a large, international geographic area. The user network, in some implementations, can be separate and independent from any network associated with any other participant or entity in the feature engineering environment 100, such as external data sources 106 or integrated systems 104. In some implementations, the users 102 can include anyone who initiates a request with the system 108 at a remote computing device 158, such as mobile device 158a, computer 158b, or any other type of remote computing device. In one example, users 102 submit requests at one or more user interface screens provided by the feature engineering system 108 through a web or application interface.

In some examples, the requests can be for market assessments of one or more property values submitted by real-estate professionals, property appraisers, mortgage lenders, government sponsored enterprises (GSEs), or interested home buyers. The requests may be submitted in the form of addresses, geographic coordinates (e.g., latitude/longitude) or individual properties or indications of regions of properties (e.g., zip code, city, county). In some embodiments, the requests submitted to the feature engineering system 108 can include requests for identification of one or more comparable properties ("comps") to a submitted property. The requests may also include property value features that are important to a specific user 102 as well as specific demographic groups or types of properties that are being targeted by the integrated systems 104. The information provided in a request, in some examples, may be stored in data repository 110 as request data 111.

In some implementations, the users 102 can submit requests to the feature engineering system 108 at a user interface screen presented by the system 108 to a remote computing device 158 in a website or application interface. In some examples, the users 102 can upload the request to the system 108 as a data file of addresses or geographic coordinates. The requests provided to the feature engineering system 108 from the users 102 may be independent from the other participants and in a different format than the data provided by the external data sources 106 and integrated systems 104. Alternatively, the feature engineering system 108 can proactively access data uploaded or provided by the users 102 on various platforms such as user-local sources and/or the external data sources 106.

Integrated systems 104, in some embodiments, include computing devices and databases distributed across a widely dispersed network that may be distributed across a large, international geographic area. In some implementations, the integrated systems 104 can include computing systems that use customized property feature vectors generated by the feature engineering system 108 for their own applications. The integrated system network can be separate and independent from any network associated with any other participant in the feature engineering environment 100, such as the external data sources 106 or users 102. Like the users 102, the integrated systems 104 can submit requests to the feature engineering system 108 for customized feature vectors for one or more properties. In some examples, the requests provided by the integrated systems 104 may include property location identification information as well as system attribute preferences including specific regions or types of property attributes, such as single family or multi-family home, zip code, county, density centers of homes that have a potential for real estate transactions (e.g., rural or urban communities), or demographics of a community. In some implementations, the feature engineering system 108 can tailor the customized property feature vectors to reflect the attribute preferences of the integrated systems 104. In some aspects, the integrated systems 104 provide preferred types of property features to the feature engineering system 108, and the system 108 provides a feature vector that includes the preferred types of features as well as additional features that show a strong correlative impact on property value determination or other metric measured by a respective integrated system 104. In some examples, the preferences of the integrated systems 104 and other request information may be stored in data repository 110 as request data 111.

In some examples, the integrated systems 104 can include automatic valuation model (AVM) systems that predict property values based on different types of property attributes. The integrated system 104 may also include collateral evaluation systems that perform loan-to-value (LTV) calculations that provide a measure of risk (e.g., likelihood of default) associated with a mortgage. The LTV calculations, in some implementations, use the customized feature vectors generated by the system 108 to more accurately predict the value of a property. In some examples, GSEs and lenders can use collateral evaluation systems to determine whether to buy a loan or close a loan for a property, and the collateral evaluation systems can, in some instances, replace a manual appraisal process. In some embodiments, the integrated system 104 can also include comparable property identification systems that use the customized property featured vectors to identify comparable properties based on shared features between property feature vectors. In some implementations, the integrated systems 104 can also include a real estate marketing system that can use the customized property feature vectors to generate targeted marketing materials for different demographic communities based on the geospatial and augmented property features.

In some embodiments, the functionality of the integrated systems 104 may be incorporated into the feature engineering system 108. For example, output generation engine 146 can be configured to determine property values, perform collateral evaluations, identify comparable properties, and identify properties to market to different demographic groups based on the customized property feature vectors.

External data sources 106, in some implementations, include computing devices and databases distributed across a widely dispersed network that may be distributed across a large, international geographic area. The external data source networks can be separate and independent from any network associated with any other participant in the feature engineering environment 100, such as the users 102 or integrated systems 104. In addition, the data handled and stored by the external data sources 106 may be in a different format than the data handled and stored by the other participants of the feature engineering environment 100. In some implementations, the external data sources 106 may include public and private data sources that provide tagged GIS map data as well as amplifying data that is used by the feature engineering system 108 to augment GIS data in an engineered feature vector for a queried location. In one example, the external data sources 106 that provide GIS map data can include OpenStreetMap® (OSM), ArcGIS®, Google Maps®, or any other geospatial data source that tags and defines objects that can be converted to a predetermined format. In one example, the geospatial data sources provide metadata in a tabular format which includes a data type tag and a vector that encodes each location on the map as a point, line or polygon. In other examples, the geospatial data sources can provide metadata to the feature engineering system 108 in other formats (e.g., Javascript Object Notation (JSON) and Extensible Markup Language (XML) formats), and data management engine 130 converts the received data into a tabular format.

In some embodiments, the external data sources 106 can also include sources that provide amplifying information that the feature engineering system 108 uses to augment geospatial features in property feature vectors. In some examples, the external data sources 106 that provide amplifying information can include websites, servers, and data sources for public property records systems, multiple listing service (MLS) systems, weather data systems, catastrophic weather zone systems (e.g., flood, tornado, and tornado zones), land topology data systems (e.g., water level data, land elevation data) traffic monitoring and prediction systems, school and school zone ratings systems, business directories, business rating systems, job posting systems, search engine results, demographic data systems, and any other computing systems that provide amplifying information for geospatial features included in a property feature vector.

In some examples, the external data sources 106 can also provide training data 129 that a feature analytics engine 144 uses to train machine learning data models 122, which are used by the system 108 to identify correlations between geospatial features and property values. The feature engineering system 108, in some examples, can also use the trained data models 122 to generate system outputs in response to a query received from a user 102 or integrated system 104. In some implementations, the GIS data 112 and amplifying data 116 can be used as training data 129. In addition, real estate sales data, MLS system data, and appraisal data can also be part of training data 129.

The users 102, integrated systems 104, and external data sources 106, and data repository 110 can connect to the feature engineering system 108 through computing devices 158 (e.g., mobile device 158a, computer 158b, or any other type of computing device) via a wired or wireless network (not shown). The network can include one or more networks, such as the Internet and can also communicate via wireless networks such as Wi-Fi, BLUETOOTH, cellular networks including EDGE, 3G, 4G, and 5G wireless cellular systems, or any other wireless form of communication that is known.

The feature engineering system 108 includes one or more engines or modules that perform processes associated with identifying and extracting features from GIS data that affect property values, augmenting the extracted features with amplifying data, generating customized feature vectors for properties including GIS data and amplifying data, and using the customized feature vectors to make market assessments that include property value determinations. References to the engines or modules throughout the disclosure are meant to refer to software processes executed by circuitry of one or more processing circuits, which can also be referred to interchangeably as processing circuitry. In some implementations, the processes associated with the feature engineering system 108 can be performed by one or more servers having one or more processing circuits such that some processes or portions of processes may be performed on different servers.

In one example, the feature engineering system 108 includes a data management engine 130 that organizes the data received by the feature engineering system 108 from the users 102, integrated systems 104, and external data sources 106 and controls data handling during execution of the processes described further herein. In some implementations, the data management engine 130 processes data gathered by data mining and collection engine 132 from the external data sources 106 and loads the gathered data to data repository 110 as GIS data 112, amplifying data 116, and training data 129. The data management engine 130 also extracts, organizes, and links information included in user-submitted requests to respective property feature vectors 114 for the properties associated with the requests. In some examples, the data management engine 130 may also associate request data 111 with feature data 120 stored in data repository 110. Feature data 120, in some implementations, includes property attributes that are important to users 102 and/or integrated systems 104 for their respective applications, such as particular demographic groups (e.g., retirement communities), types of homes (e.g., single family or multi-family), and geographic regions (e.g. zip codes, cities, counties). In addition, the data management engine 130 may perform a data validation/normalization process to configure GIS data 112 and amplifying data 116 into a predetermined format compatible with a format of the files of the data repository 110. For example, if the received GIS data 112 is in a JSON or XML format, the data management engine 130 can convert the received data into a tabular format with a data type tag and encoded coordinates for a respective location point, line or polygon.

The data management engine 130, in some embodiments, also controls the interaction of the feature engineering system 108 with at least one data repository 110 associated with the feature engineering environment 100. For example, the data management engine 130 controls the storing and access of both system-generated data and system-received data as well as the interactions between system-generated and system-received data. In some examples, the data management engine 130 receives GIS data 112 from at least one external data source 106, normalizes the received GIS data 112 into a predetermined format that is compatible with the system 108, and stores the GIS data 112 in data repository 110. Additionally, the data management engine 130 receives trained data models 122 from feature analytics engine 144 and stores the trained data models 122 in data repository 110. The data management engine 130 can also access any of the data from the data repository 110 for use by the feature engineering system 108, such as trained data models 122 and property feature vectors 114, which output generation engine 146 uses to make market assessments of properties. Additionally, the data management engine 130 controls the flow of data between the data repository 110 and the feature engineering system 108.

The feature engineering system 108, in some implementations, also includes a data mining and collection engine 132 that controls the gathering of data from the users 102, integrated systems 104, and external data sources 106 in real-time. In some implementations, the data mining and collection engine 132 receives the requests submitted to the feature engineering system 108 by the users 102 and integrated systems 104 and automatically passes the submitted requests to the data management engine 130. In addition, the data mining and collection engine 132 can receive other manually entered information from the participants in the feature engineering environment 100, such as the specific feature preferences provided by the integrated systems 104.

In some examples, the data mining and collection engine 132 can access the data from external data sources 106 by periodically performing web scraping or crawling procedures at external data source websites. In one example, a data mining and collection engine 132 can perform scrapes of external data source websites at predetermined intervals (e.g., weekly, monthly, quarterly, yearly) to update GIS data 112, amplifying data 116, and/or training data 129 stored in data repository 110. In some implementations, the data mining and collection engine 132 also accesses demographic information for different geographic regions from demographic data source computing systems and websites (e.g., census bureau website), which is stored in data repository 110 as demographic data 118. In another example, the data mining and collection engine 132 can periodically monitor the external data source servers and websites for updates and perform scrapes when any data updates are detected. For example, if a geospatial data source introduces a new type of location tag, the data mining and collection engine 132 can scrape all of the GIS data locations that have the new type of tag and incorporate the scraped data into the GIS data 112. In some implementations, the feature engineering system 108 can access data from external data sources 106 through a subscription service in which the external data sources 106 provide GIS data 112 and/or amplifying data 116 to the feature engineering system 108 through an electronic data interchange (EDI).

The feature engineering system 108, in some embodiments, also includes an event trigger engine 134 that manages the flow of data updates to the feature engineering system 108. In some implementations, the event trigger engine 134 detects updates to GIS data 112, amplifying data 116, training data 129, or any other type of data collected or controlled by the feature engineering system 108. For example, the event trigger engine 134 detects modifications or additions to the location metadata in the GIS data 112, which may indicate that new map features have been added. In response to detecting an update to the GIS data 112, the event trigger engine 134 loads the updated data to GIS data extraction engine 136 for adding to feature vectors for nearby properties and/or feature analytics engine 144 for updating applicable trained data models 122. In addition, the event trigger engine 134 operates automatically to trigger the data management engine 130 when updated data is detected by the data/mining and collection engine 132.

The feature engineering system 108, in some implementations, includes a GIS data extraction engine 136 that extracts targeted feature metadata from GIS maps obtained from one or more external data sources 106 that can have an impact on property values. At each property location, the GIS data extraction engine 136 can detect features within one or a combination of maps from multiple GIS sources (e.g., OSM, ArcGIS®, Google Maps®). In some examples, the GIS map sources include encoded objects (e.g., lines, points, polygons) that delineate locations of topographical features (e.g., bodies of water, national parks, forests, lakes, campgrounds, beaches), amenity features (e.g., hospitals, schools police stations, fire stations, colleges and universities), transportation features (e.g., bus stops, major highways, residential roads and highways, railways, airports and airways), public utility features (e.g., power plants, power lines, power generators, windmills), leisure features (e.g., public parks, swimming pools, golf courses, professional sports stadiums and arenas), land use features (landfills, industrial parks, cemeteries), and economic features (e.g., retail businesses, restaurants, corporations).

In some implementations, the GIS data extraction engine 136 scans a GIS map to detect predetermined types of GIS features encoded into the map that have an impact on property values. In some examples, the GIS data extraction engine 136 applies a bounding box around a property location and identifies GIS features that overlap or are within a predetermined distance of the bounding box. The identified GIS features are extracted, linked to the property location, and stored as entries in a property feature vector 114 for the location. In some implementations, the metadata features extracted from GIS maps by the GIS feature extraction engine 136 can include geocoded coordinates (e.g., latitude/longitude), type of object (e.g., point, line, polygon), and one or more data tags. For example, the data tags can include a type of object (e.g., highway name, street name, school name, store name, metro station).

In addition, the GIS data extraction engine 136 can update the GIS data features in property feature vectors 114 in response to a notification by event trigger engine 134 that the data mining and collection engine 132 has updated GIS data 112 for one or more locations in data repository 110. In some examples, the GIS data extraction engine 136 can also add or remove GIS data features from property feature vectors 114 in response to learned knowledge by feature analytics engine 144 that one or more newly detected features affect property values and/or that one or more features that previously had an impact on property values no longer have a significant impact.

Figure 2:
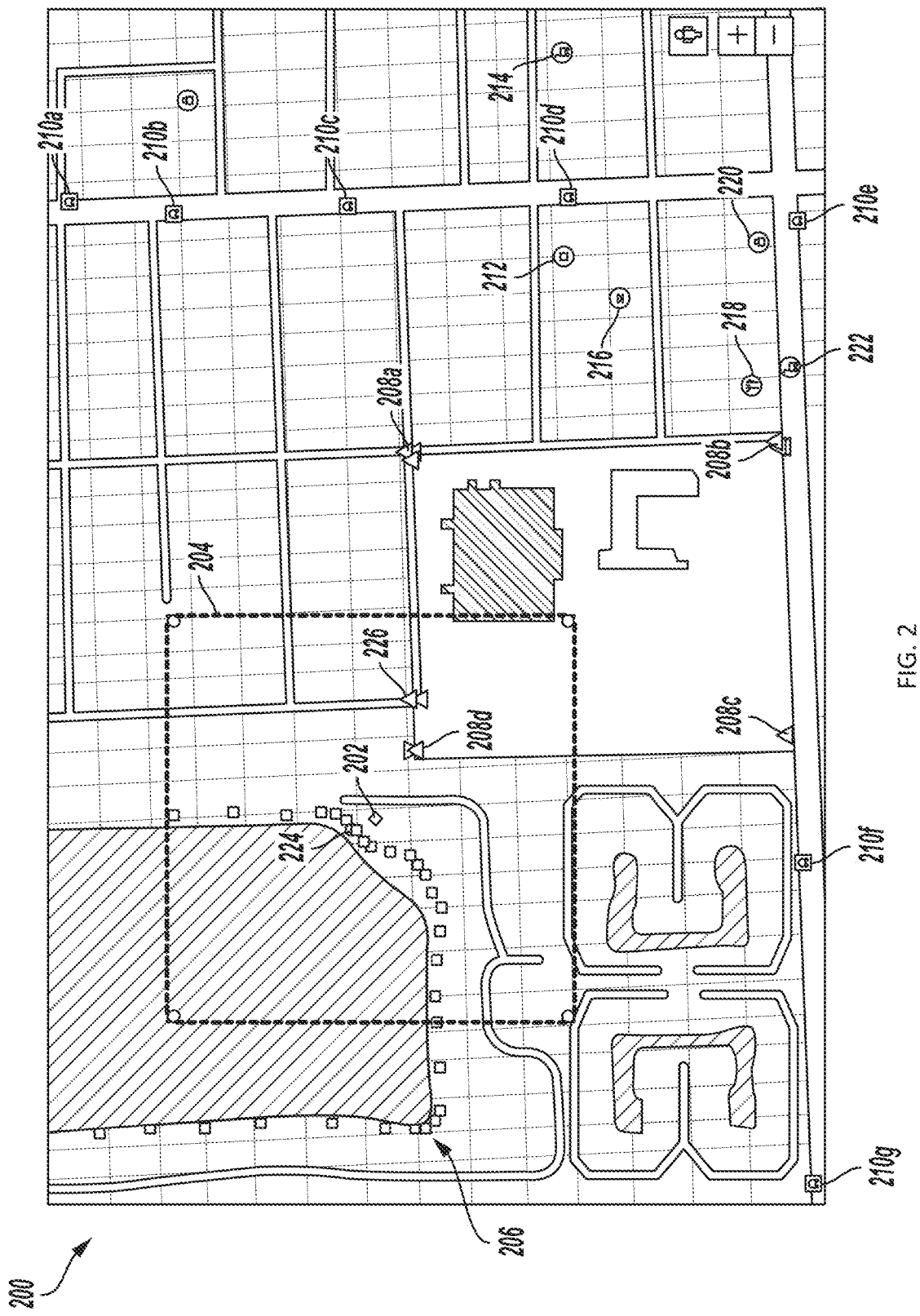
FIG. 2 illustrates a geospatial information system (GIS) map with detected GIS features for a property location.

For example, FIG. 2 illustrates a GIS map 200 with detected GIS features within a predetermined distance of a property location 202. As shown in GIS map 200, GIS data extraction engine 136 applies a bounding box 204 centered on property location 202, which in one example has sides that are a tenth of a mile long. The GIS data extraction engine 136, in some examples, detects GIS polygon objects for body of water 206 and high school 208 that overlap bounding box 204. In some examples, if the GIS object is a line or polygon, the GIS data extraction engine 136 identifies a closest point in the line or polygon to the property location 202. For example, for the high school 208, point 208d is the closest point to property location 202. For body of water 206, point 224 is a closest point to the property location 202. In some implementations, GIS data extraction engine 136 can also detect other locations within a predetermined distance of bounding box 204. For example, restaurants 216, 218, grocery stores 214, 222, pharmacy 220, bus stops 210, and a product distribution center 212 may fall within the predetermined distance from the bounding box 204. The GIS data extraction engine 136 links the detected GIS features to the property location 202 and are stored in data repository 110 as entries in a property feature vector 114 for location 202.

While the bounding box 204 is illustrated as a rectangular shape, other predefined shapes can be used with similar effect. In some embodiments, the GIS data extraction engine 136 can adjust the size of bounding box 204 based on a density of GIS features within a vicinity of property location 202. For example, the GIS data extraction engine 136 may apply smaller bounding boxes to property locations in urban areas with higher densities of amenity features, transportation features, land use features, economic features, and public utility features than in rural areas. In some implementations, upon applying bounding box 204 to property location 202, the GIS data extraction engine 136 can increase or decrease the size of bounding box 204 such that a number of detected GIS features that overlap or are within a predetermined distance of the bounding box 204 is greater than a minimum threshold and less than a maximum threshold.

The GIS data extraction engine 136, in some embodiments, can extract features from GIS maps in response to receiving a user-submitted request for a property value at one or more locations 202. In other examples, the GIS data extraction engine 136 performs batch feature metadata extractions from GIS maps for multiple property locations within a geographic region (e.g., zip code, city, county, population density area). For example, independent of receiving a user-submitted request, the GIS data extraction engine 136 may extract all of the GIS metadata features within a region, which are stored as GIS data 112. Upon receiving a user-submitted request, the data management engine 130 and/or GIS data extraction engine 136 can identify the appropriate features from GIS data 112 in data repository 110 that overlap or fall within a predetermined distance of bounding box 204. Additionally, upon collection of updated GIS data features by data mining and collection engine 132, the GIS data extraction engine 136 can identify property locations 202 that fall within a predetermined distance of the newly detected GIS features and links the features to the respective property locations 202 within property feature vectors 114.

Turning to FIG. 3, a table of GIS features 300 extracted by GIS data extraction engine 136 and organized into a property feature vector 114 for a respective property location is illustrated. In some implementations, the GIS data extraction engine 136 initializes creation of a property feature vector 114 by detecting GIS features within a predetermined distance of a property location and/or bounding box surrounding the property location (e.g., bounding box 204 surrounding property location 202 in FIG. 2). As shown in the table 300, for each extracted GIS feature 312-334, a property feature vector 114 can include a GIS identification code 302 that identifies the GIS feature within a GIS map, a set of one or more geocoded coordinates 303 (e.g., latitude/longitude) for each GIS feature, and a data type 306 indicating whether the GIS feature is a line, polygon, or point. In some examples, the GIS data extraction engine 136 can also add data tags 304 to each GIS feature of a property feature vectors 114 that provide details about the type of GIS feature (e.g., highway, railway, neighborhood or city boundary, body of water, school) and name or other type of identifier for the GIS feature (e.g., street name, Glenvar Heights, South Miami Senior High School). In some implementations, the feature augmentation engine 142 uses the information in the data tags 304 to identify relevant amplifying information 116 to add to the property feature vector 114. For example, the feature augmentation engine 142 can match the school name of "South Miami Senior High School" and/or school address for GIS feature 334 to school rating data for the high school that is stored as amplifying data 116. Additionally, for each GIS feature extracted by GIS data extraction engine 136, distance calculation engine 140 computes a distance 308 between the property location and a closest point 310 in each of the extracted features.

Returning to FIG. 1, in some implementations, the feature engineering system 108 includes a geocoding engine 138 that geocodes location data received from external data sources 106 to be included as features in property feature vectors 114. In some embodiments, data received from GIS data sources may not include encoded geospatial metadata for every single geographical feature that can impact market assessments. For example, geospatial map data may not include encoded metadata for all economic features (e.g., retail businesses, restaurants, corporations). Therefore, in some examples, the geocoding engine 138 can convert business addresses received from business directory websites or business rating websites into geocoded locations that can be included as features in property feature vectors 114.

The feature engineering system 108, in some embodiments, can include a distance calculation engine 140 that calculates a distance between a property location (e.g., property location 202 in FIG. 2) and a closest point in each of the extracted GIS features (e.g., features 206-226 in FIG. 2). For example, FIG. 3 shows a closest point 310 in each GIS data feature to a property location and a distance 308 between the property location and the closest point 310. In some implementations, each of the computed distances is linked to the respective feature in the corresponding property feature vector 114, which establishes a relationship between the property location and each respective GIS feature in the property feature vector 114. In addition to being stored as part of property feature vectors 114 in data repository 110, the calculated distances to GIS features can also be stored as distance data 124, which provides for more efficient GIS feature distance calculations for other properties. Because of the established distance relationship between the property location and a GIS feature, feature augmentation engine 142 can bring in amplifying information for the GIS feature, which expands the scope of the property feature vector 114 and allows machine learning algorithms to more accurately determine which GIS features have a greatest impact on property values. For example, proximity to a high school alone may not provide as much of an indication of property value as proximity to a high school that has a high quality rating at a school rating website.

In some embodiments, the distance calculation engine 140 calculates a straight-line distance between the property location and a closest point of a respective GIS feature (e.g., point 224 for body of water 206 and point 208d for high school 208 in FIG. 2) as well as an orientation (for example, on a 3600 scale). In some examples, if another feature or obstacle, such as a body of water, falls on the path of the straight-line distance between the property location and the respective GIS feature, the distance calculation engine 140 can factor in a distance for traversing around a perimeter of the body of water. In other examples, the distance calculation can also account for traveling distance on roads between the property location and the respective GIS feature. Additionally, rather than compute the closest point distance to polygon and line GIS features, the distance calculation engine 140 can compute a distance from the property location 202 to a center point of a respective polygon or line. In still another example, the distance calculation engine 140 can compute a distance between the property location 202 and an entrance to the location of the GIS feature. For example, an entrance 226 for high school 208 may be located at Southwest 68$^{th}$ street so the distance calculation engine 140 computes the distance from property location to the entrance 226.

In some implementations, because distance calculations can be computationally expensive, the distance calculation engine 140 can leverage efficient data storage techniques for extracted GIS metadata that improve the computational efficiency of distance calculations. For example, a portion of data repository 110 may include an object-relationship data management system (ORDMS) with a spatial database extender, such as PostgreSQL® ORDMS with PostGIS® for storing GIS data 112. In some examples, because the GIS data 112 is stored in an ORDMS, the distance calculation engine 140 can employ targeted functions and syntaxes for calculating distances that are specific to GIS data 112 and the ORDMS and are more efficient than if the GIS data 112 was stored in another database format.

In some implementations, the distance calculation engine 140 uses multi-threading techniques to more efficiently use system processing resources to compute complex distance calculations for extracted GIS data features that are commonly occurring across a given area. For example, powerlines are a GIS data feature that traverse large areas within neighborhoods and communities and can have a negative impact on property values. In some examples, powerline GIS features are encoded into subsegments such that a 500-yard, 1-mile, 5-mile, or 10-mile radius surrounding a property location may include hundreds or thousands of GIS sub-segments, which increases the computational complexity of calculating a property's shortest distance to GIS powerline subsegments within a predetermined distance. By multi-threading powerline distance calculation queries to processing resources of the feature engineering system 108, the distance calculation engine 140 can calculate distance to extracted GIS features in real-time or near-real time. In one example, performing multi-threaded distance calculations improves distance calculation speed by approximately a factor of 40. In some implementations, the distance calculation engine 140 can preferentially multi-thread distance calculations for specific types of GIS features that are commonly occurring in certain geographic regions (e.g., powerlines, highways, railways). In other examples, the distance calculation engine 140 can multi-thread all distance calculations. In still another example, the distance calculation engine 140 can multi-thread the distance calculations based on a number of GIS features in a property feature vector 114 or based on a processing capacity of system processing resources.

Additionally, the distance calculation engine 140 can configure the distance calculations to be performed on distributed computing systems or in a cloud computing environment, which allows the computationally complex distance calculations to be performed in real-time or near real-time. In one example, the distance calculation engine 140 uses a software platform framework (e.g., Java®) integrated with a distributed computing system (e.g., Hadoop®) to perform distance calculations with customized functions. In another example, the distance calculation engine 140 distributes distance calculation processing tasks to a cloud-based platform, such as Amazon Web Services® or Google Cloud®.

In some embodiments, to further improve the efficiency of distance calculations between property locations and extracted GIS data features, the distance calculation engine 140 can perform calculations for sets of properties that are similarly situated with respect to a given GIS data feature in batches. For example, the distance calculation engine 140 can perform one distance calculation from a first property to a sub-section of powerline and then just apply the distance calculation to other properties in the vicinity with an adjustment factor without having to perform powerline distance calculations for each of the properties.

Figure 5:
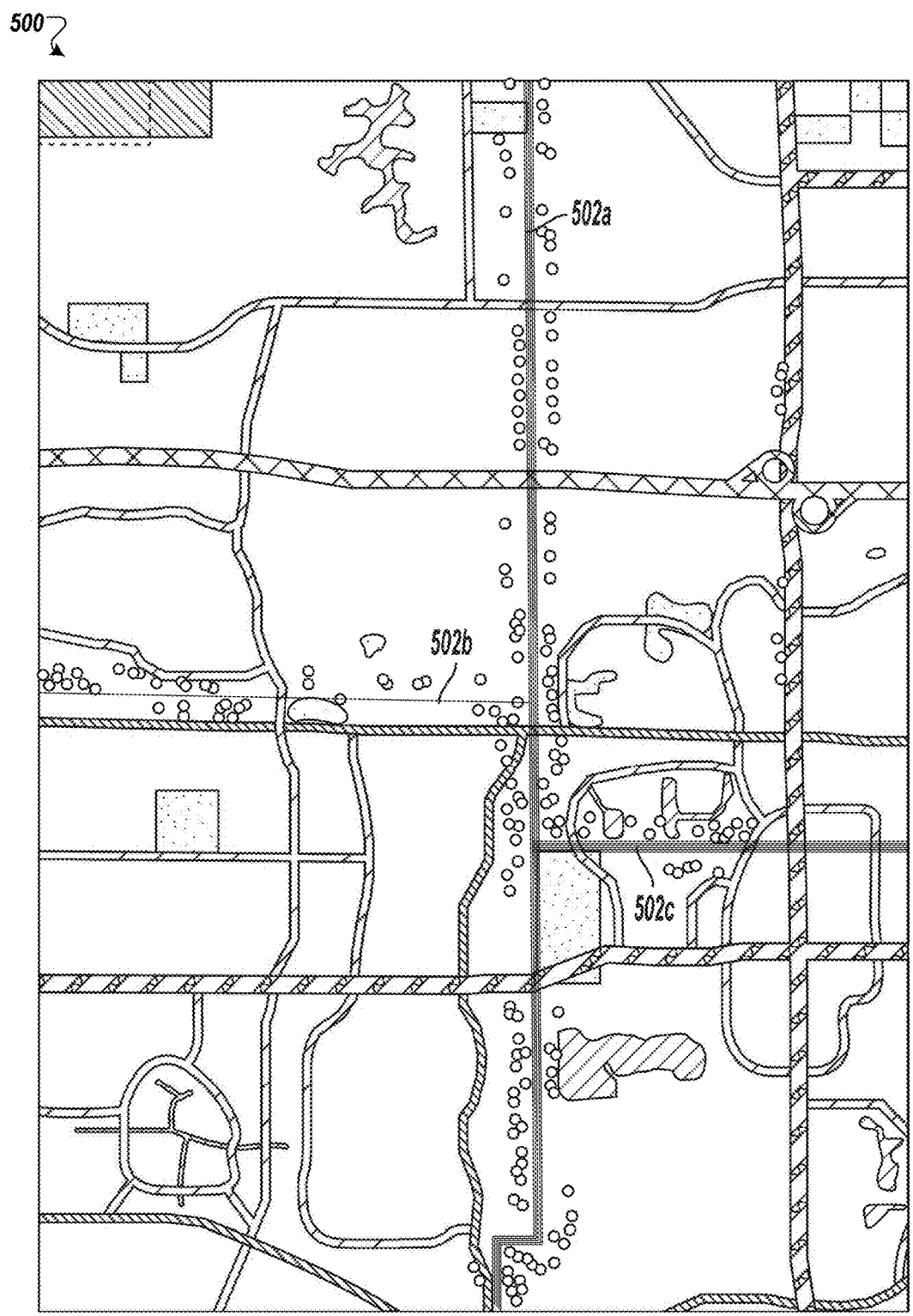
FIG. 5 is a GIS map showing properties located within the vicinity of GIS powerline features.
Figure 6:
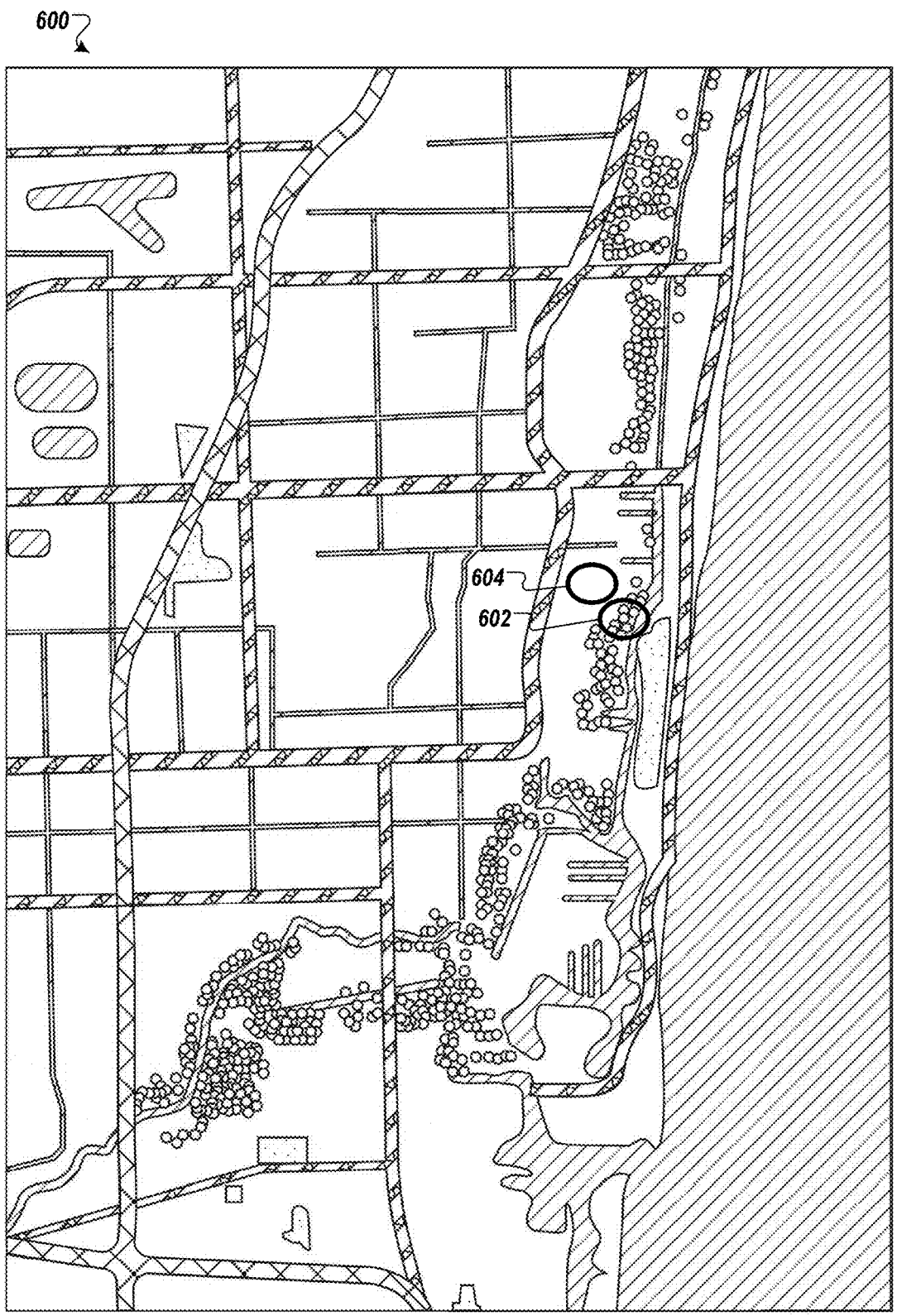
FIG. 6 is a GIS map showing waterfront properties.

For example, FIG. 5 illustrates a GIS map 500 with highlighted properties that are located within a predetermined distance of GIS powerline features 502. In some implementations, the distance calculation engine 140 can perform batch distance calculations for properties that are located within a predetermined distance of portions of the powerline features 502. For example, the distance calculations for properties in the vicinity of powerline section 502b may be performed in a single batch, and similarly for the properties located within a predetermined distance of powerline sections 502a and 502c. In another example, FIG. 6 illustrates a GIS map 600 of highlighted waterfront properties. In some implementations, the distance calculation engine 140 may perform a batch computation to identify which properties are immediately adjacent to a GIS body of water feature since a body of water can contribute significantly to the value of a waterfront property but may not contribute significantly to a property located across the street or a block away from the body of water. As an example, location 602 represents a location where properties have no impediment to a water view while location 604 represents a location where properties have an impediment to a direct water view. Additionally, the distance calculation engine 140 can identify which properties are immediately adjacent to a canal or tributary water access that provides for easy entry from home with a kayak or installation of a boat dock. In some examples, identifying waterfront properties as a batch operation can save processing costs because the properties are all being identified with respect to the same GIS feature.

Returning to FIG. 1, in some implementations, the distance calculation engine 140 can calculate distances from property locations to GIS features in batches based on geographic region and/or a type of feature or set of features that a particular user 102 is interested in. For example, a user 102 may only be interested in a particular geographic region (e.g., zip code, county, population center), type of property (e.g., single family, multi-family), and/or demographic group (e.g., retirement communities, communities with large percentages of young families, urban communities with few families). In some examples, the distance calculation engine 140 may perform batch distance calculations for property feature vectors 114 that meet specifications indicated by the user 102 in a submitted request.

In some implementations, the feature engineering system 108 can include a feature augmentation engine 142 that augments GIS features of property feature vectors 114 with amplifying data 116 associated with each feature. For example, the feature augmentation engine 142 can match a feature name, data tags, and or geocoded location from GIS feature data to amplifying data 116 stored in the data repository 110. In some implementations, the data mining and collection engine 132 collects information related to GIS features in a geographic area from one or more external data sources 106, which is stored as amplifying data 116 in data repository 110. In response to the GIS data extraction engine 136 forming a property feature vector 114 from one or more extracted GIS features, the feature augmentation engine 142 searches the amplifying data 116 for information associated with each GIS feature. In other examples, the feature augmentation engine 142 can trigger data mining and collection engine 132 to gather amplifying information from websites or servers of external data sources 106 to augment respective property feature vectors 114.

For example, a property feature vector 114 can include GIS data 112 for a high school that is closest to a property location (for example, high school 208 that overlaps a bounding box 204 for property location 202 in FIG. 2), a distance between the property location and the high school. In some implementations, proximity to a school can have an impact on values of surrounding properties, but in some cases, the quality of the nearby school can have an even greater impact on the property value than proximity alone. For example, a highly rated school can have a large positive impact on property value and desirability of nearby homes while a poorly rated school can have the opposite effect. The feature augmentation engine 142 can augment the GIS data 112 and distance data 124 for the high school with amplifying school zone information and a quality rating for the school obtained from a school rating website and/or a school board website that provides performance ratings for schools within a school district.

In some implementations, the feature augmentation engine 142 augments the GIS features in a property feature vector 114 with machine-identified features and manually-identified features provided to the system by users 102 and/or integrated systems 104. For example, users 102 may have an idea about what features have an impact on the property values in a given area which they provided to the system 108 as inputs at a user interface screen. In one example, the feature augmentation engine 142 can augment the GIS features in property feature vectors 114 with information associated with the manually-identified features. For example, manually identified features may include rating of a closest school, proximity of a closest grocery store, and whether a property has a waterfront view. The manually-identified features can also include sets of features associated with one or more geographic regions or demographic groups that are of interest to specific users 102.

In some implementations, the feature augmentation engine 142 obtains amplifying information 116 for one or more machine-identified features. In some examples, the feature analytics engine 144 can automatically identify one or more types of features and/or amplifying data 116 that have an impact on property values in a given area. For example, the feature analytics engine 144 may determine from machine-trained data models that particular traffic patterns and/or speed limits in a geographic area have an impact on property values, and the feature augmentation engine 142 can augment GIS data 112 for roads within a vicinity of a property location with the information about the traffic patterns and/or speed limits identified by the feature analytics engine 144.

The feature augmentation engine 142, in some embodiments, can apply different types of amplifying data 116 to extracted GIS data features in layers based on characteristics of a respective geographic region, preferences of dominant demographic groups within a geographic region, and dominant value-affecting features identified by feature analytics engine 144. For example, the feature augmentation engine 142 can augment property feature vectors 114 for homes in coastal regions that have a risk of hurricane damage with catastrophic modeling data for hurricanes in those coastal regions. The feature augmentation engine 142 can similarly augment property feature vectors 114 with flood zone data obtained from catastrophic modeling systems that provide indications of a likelihood that respective properties will experience flooding casualties. As another example, for properties that are located near a coast with a receding waterline, the feature augmentation engine 142 can apply shoreline position prediction data to GIS features for a coast of a body of water within a predetermined distance of a property location.

In some embodiments, the feature augmentation engine 142 can also apply amplifying transportation data to property feature vectors 114, which can include traffic data and/or public transportation data. In some implementations, the traffic data can include average commute times to a nearest city center from a property location, traffic congestion information for roads within a predetermined distance of a property, and traffic pattern information (e.g., whether nearby traffic patterns include left or right turns across multiple lanes of traffic without the assistance of a traffic light). For example, the traffic data can be linked to a road or set of roads or highways within a predetermined distance of a property location. In some implementations, public transportation data can include routes and frequency of stops for bus stops (e.g., bus stops 210 in FIG. 2) and metro stops and traffic along bus and metro routes.

Linking different types of amplifying information to encoded GIS features interconnects multiple different types of information associated with a property, which allows the feature analytics engine 144 to identify relationships between the different types of information that impact property values. In one example, the feature augmentation engine 142 can augment property feature vectors 114 with both traffic data and public transportation data that provides the feature analytics engine 144 multiple dimensions of transportation data thereby enabling the feature analytics engine 144 to determine whether the combination of traffic congestion and ease of public transportation use affects property values at a given location.

In some implementations, the feature augmentation engine 142 can augment property feature vectors 114 with economic-based information. For example, for each business location within a predetermined distance of a property, the feature augmentation engine 142 can link amplifying data 116 that includes number of employees, net worth of the business, and number of advertised jobs for the business, which can be obtained from external data sources 106, such as job search websites, business directory websites, and business news sites. Additionally, the economic data may also include proximity of each of the businesses to metro and/or bus stops. In some examples, the economic data for nearby businesses can provide an indication of availability of jobs, which can be another indicator of value of property locations.

In some embodiments, the feature augmentation engine 142 can also augment property feature vectors 114 with customer approval information for different types of businesses surrounding a property location. For example, customers may prefer a first type of grocery store over all other types of grocery stores and having (or not having) at least one of the first type of grocery store within a predetermined distance of a property location can have an impact on property values. Additionally, the feature augmentation engine 142 can also generate amplifying information from combinations of GIS features included in a property feature vector 114. For example, because having multiple grocery stores of any type near a property location can have a positive impact on property value, the feature augmentation engine 142 can generate a grocery store density feature from grocery store GIS data included in a property feature vector 114.

In addition, the feature augmentation engine 142 can update augmented data features in property feature vectors 114 in response to a notification by event trigger engine 134 that the data mining and collection engine 132 has updated amplifying data 116 for one or more locations in data repository 110. In some examples, the feature augmentation engine 142 can also add or remove augmented data features from property feature vectors 114 in response to learned knowledge by feature analytics engine 144 that one or more newly detected features affect property values and/or that one or more features that previously had an impact on property values no longer have a significant impact.

In some embodiments, the feature engineering system 108 includes a feature analytics engine 144 that trains data models 122 with machine learning algorithms to determine property values from augmented property feature vectors. In addition, using the trained data models 122, the feature analytics engine 144 can identify which features or groups of features of property feature vectors 114 have a greatest correlative impact on accurately making market assessments, determining property values, identifying comparable properties, and/or identifying properties to market to different demographic groups. Because the feature analytics engine 144 has access to property feature vectors 114 for an expansive geographic area that can include multiple states, regions, and countries, the feature engineering system 108 can make property value determinations with a much broader scope of knowledge than humans who have localized knowledge. Further, humans (e.g., real estate agents, property appraisers, mortgage lenders, GSE personnel) may not realize that particular features impact a property value and can therefore unintentionally exclude features from their property value analysis.

By using machine learning algorithms to train the data models 122 that predict home values and identify which features and/or combinations of features have the greatest impact on property values, the feature analytics engine 144 can determine the degree to which each GIS feature and augmented feature in a property feature vector 114 affects property values. In some implementations, the feature analytics engine 144 applies weighting factors to each of the features of property feature vectors 114 that indicates a relative impact on determining property value. In some examples, the feature analytics engine 144 can also automatically identify one or more types of features and/or amplifying data 116 that have an impact on property values in a given area in addition to user-identified features. In other examples, the feature analytics engine 144 identifies all of the features for the property feature vectors 114 through machine learning and incorporates no user-identified features. Further, the feature analytics engine 144 can also continuously update and refit the trained data models 122 to reflect updates to GIS data 112 and amplifying data 116 that have been incorporated into property feature vectors 114 and/or training data 129. In some examples, the feature analytics engine 144 can identify new features and/or adjust weights of current features that affect property values.

In some examples, the feature analytics engine 144 trains the data models 122 with training data 129 that includes property feature vector data with GIS data 112 linked to amplifying data 116 for property locations processed by the feature engineering system 108. In addition, the training data 129 may also include home sale data, MLS system data, and appraisal data (for example, features that appraisers have identified as having an impact on property value). In some locations where home sales are infrequent and property value information is incomplete or inconsistent, the training data 129 may only include property feature vectors 114 for the location. In some embodiments, the feature analytics engine 144 can also identify cities, neighborhoods, or regions in other parts of the country that have similar characteristics to a location with sparse property value data. In some examples, the feature analytics engine 144 can train data models for the sparse property value locations with property feature vectors 114 and property value information from the locations with the shared characteristics.

In some embodiments, the feature analytics engine 144 can train individual data models for different geographic regions (e.g., city, county, zip code, population center), demographic groups, and home types, which are saved in data repository 110 as trained data models 122. In some examples, the features that impact property values in one location may not be the same features that impact property values in another location so having trained data models 122 customized to individual locations provides for more accurate property value determinations. Similarly, different demographic groups within a community may value certain property features more than others, which can affect property values. For example, individuals who are looking to purchase homes in retirement or senior citizen communities may prioritize walkability of the neighborhood or access to golf courses over school quality. On the other hand, families with children looking to purchase single family homes in the same zip code as a retirement community may prioritize quality of a nearby school over most other property features. In some examples, the feature analytics engine 144 uses stored demographic data 118 gathered from one or more external data sources 106 by data mining and collection engine 132 to train each data model that is specific to a demographic group. Because the feature engineering system 108 trains data models 122 that are customized to different locations, demographic groups, and types of outputs, the feature engineering system 108 can generate accurate property values and other types of outputs in real-time or near-real time.

In some implementations, the feature analytics engine 144 can also train individual models based on each type of output generated by the feature engineering system 108. For example, the feature analytics engine 144 can train models to predict property values as well as other models that identify comparable properties and/or which properties should be marketed to particular demographic groups. Models can also be trained for specific types of housing (e.g., single-family, multi-family, short sales, pre-foreclosure sales).

The feature engineering system 108, in some implementations, includes an output generation engine 146 that can generate system outputs in real-time or near-real time in response to queries received from users 102 and/or integrated systems 104. In some examples, outputs produced by the output generation engine 146 are stored in data repository 110 as output data 128. For example, using the trained data models 122, output generation engine 146 can be configured to determine property values, perform collateral evaluations, identify comparable properties, and identify properties to market to different demographic groups based on the customized property feature vectors. The output generation engine 146, in some embodiments, can provide outputs to user computing devices 158 at a website or application interface, through one or more messaging interfaces (e.g., email, text messaging), or in a predetermined data file format. In other examples, the output generation engine 146 can be configured to output customized property features vector to users 102 and/or integrated systems 104 in a predetermined output format, such as a tabular format.

In some embodiments, the output generation engine 146 can update previously generated output data 128 to reflect data updates to property feature vectors 114 and/or training data 129. Additionally, the output generation engine 146 can transmit the updated output data 128 to respective users 102 and/or integrated systems 104 that previously submitted requests for information affected by the updated output data 128. For example, the output generation engine 146 can transmit updated outputs to users 102 that have previously submitted requests for property values from the feature engineering system 108.

In some implementations, data associated with the processes performed by the feature engineering system 108 is stored in one or more data repositories of the feature engineering environment 100 such as data repository 110. Data received by or obtained from the feature engineering system 108 from the users 102, integrated systems 104, and external data sources 106 can be stored in real-time with respect to when the data is received from data sources. In addition, one or more types of data can be stored automatically in response to receiving one or more data files from the data sources. In addition, the data stored in the data repository 110 can be updated automatically from one or more sources at predetermined time intervals or whenever new or updated data is detected. For example, automatically updated data can include the GIS data 112, amplifying data 116, demographic data 118, and portions of training data 129 obtained from servers/websites of the external data sources 106. In some examples, the automatically updated data can be obtained through the web scraping processes performed by the data mining and collection engine 132. In some examples, at least a portion of data repository 110 can be a ORDMS with a spatial database extender for storing GIS data 112 in a format that allows the distance calculation engine 140 to more efficiently compute feature distances by employing specific ORDMS functions and syntaxes.

The data stored in the data repository 110 can also include manually entered information that is input via UIs, such as those of the external devices 158 of users 102 and/or integrated systems 104 and is received by the data mining/collection engine 132 of the feature engineering system 108. The manually entered information can be processed by the data management engine 130 before being disseminated to other processing engines of the feature engineering system 108. In some embodiments, the manually entered data can include request data 111 and feature data 120 provided by users 102 and/or integrated systems 104 at one or more user interface screens.

The data repository 110, in some implementations, can also store data that is generated by the feature engineering system 108 when executing the processes associated with engineering customized feature vectors for properties. For example, the data repository 110 can store trained data models 122 generated by feature analytics engine 144 and property feature vectors 114 generated by a combination of GIS data extraction engine 136, distance calculation engine 140, and feature augmentation engine 142. Additionally, geocoding engine 138 generates geocoded data 126 by converting property location information to a predetermined geocoded format. In some examples, distance calculation engine 140 computes distances from a property location to each GIS feature within a predetermined distance of the location, which is stored in data repository 110 as distance data 124 and incorporated into a respective property feature vector 114. Further, output generation engine 146 produces output data 128 that corresponds to requests received from users 102 and integrated systems 104 using learned machine knowledge in the trained data models 122.

Figure 4:
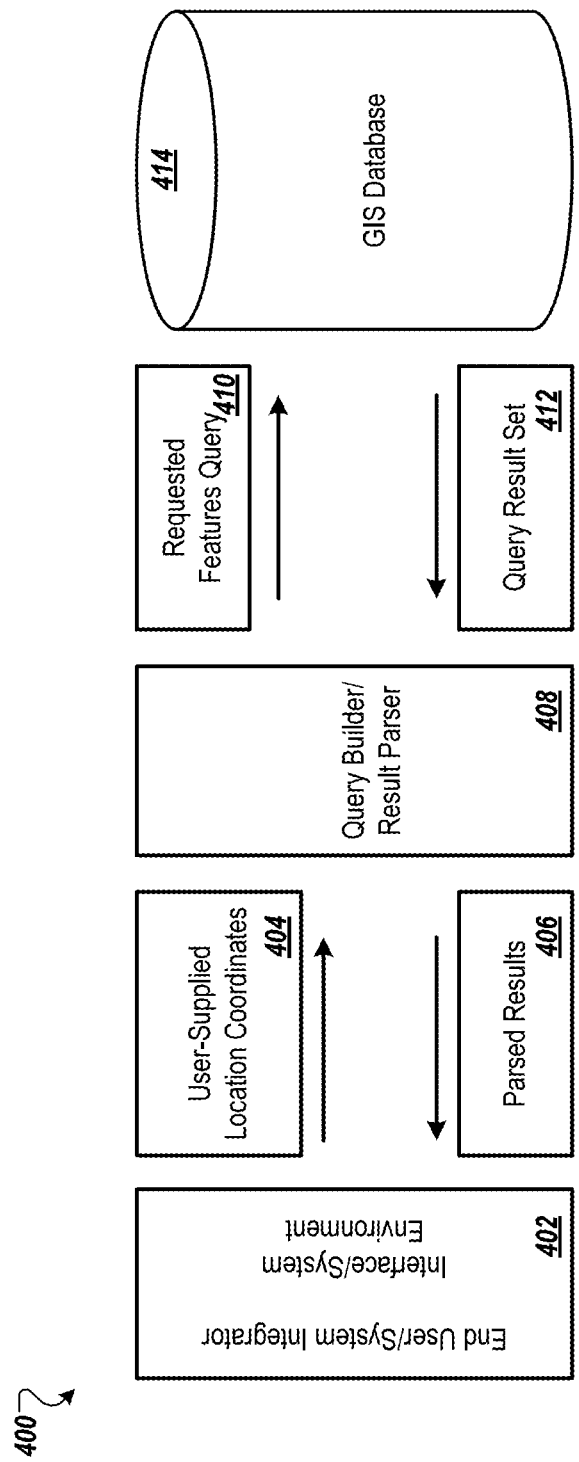
FIG. 4 is a diagram of data flow in a feature engineering system.

Turning to FIG. 4, a data flow through one or more computing systems of an example feature engineering system 400 (e.g., feature engineering system 108 in FIG. 1) is illustrated. In some implementations, the feature engineering system 400 includes one or more front-end computing systems 402 that interface with end users of the system and/or integrate with external computing systems that use outputs generated by the system 400 (e.g., property feature vectors) to make property value determinations and other associated assessments (e.g., loan-to-value ratio determinations, comparable home assessments). In some examples, the system 400 also includes a set of back-end computing systems 408 that provide an interface between the front-end computing systems 402 and a GIS database 414 of extracted GIS features and other amplifying property information (e.g., data repository 110 in FIG. 1). In one example, the back-end computing systems 408 provide the processing resources for an end-user application programming interface (API) that is presented to users by the front-end computing systems 402.

For example, at the API presented by the front-end computing systems 402, end users can provide location coordinates 404 or address information for one or more property locations. In some embodiments, in response to receiving the location coordinates 404, the back-end computing systems 408 can generate a database query 410 to obtain data for GIS features from GIS database 414 that are within a predetermined distance of the location coordinates 404. Responsive to receiving a query result set 412 from the GIS database 414, the back-end computing systems 408 parse the result set 412 into a property feature vector and/or generate any other outputs requested by the end user. In some implementations, the back-end computing systems 408 transmit the parsed results 406 to the front-end computing systems 402, which can be presented to system users through the end-user API.

Figure 7:
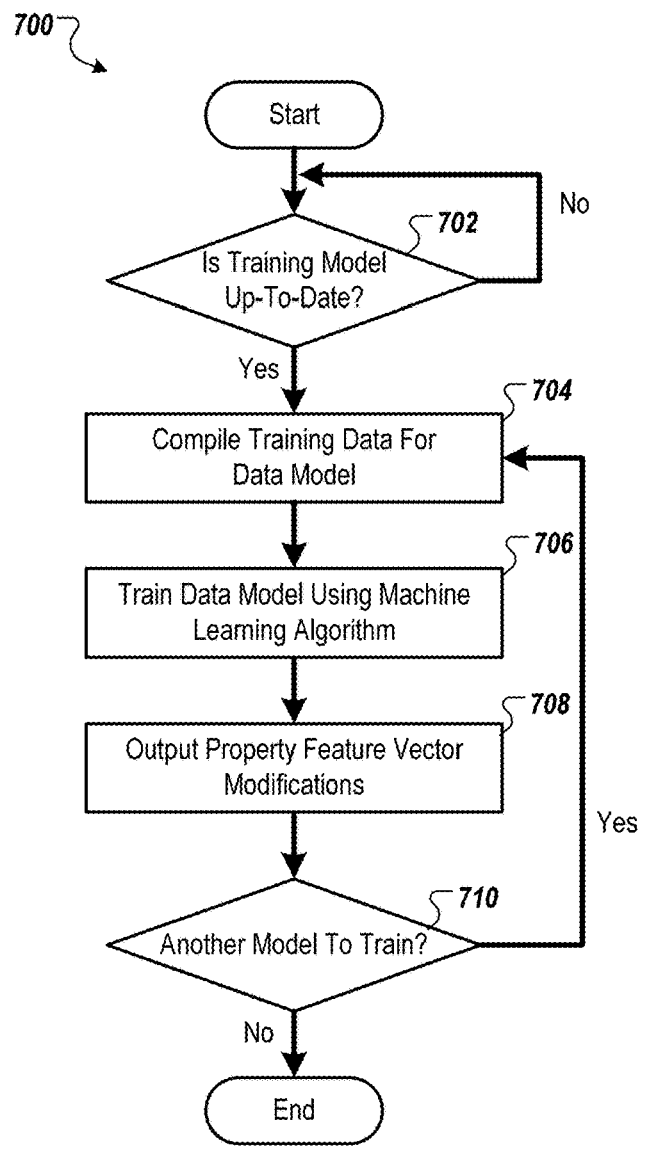
FIG. 7 is a flow chart of an example method of training data models for a feature engineering system.

Turning to FIG. 7, a flow chart of an example method 700 for training data models for a feature engineering system 108 is illustrated. In some examples, the system 108 uses trained data models 122 to calculate property values and identify property features that have an impact on value. In some examples, the method 700 is performed by feature analytics engine 144 of feature engineering system 108 (FIG. 1). In some embodiments, the method 700 is performed on a periodic basis to incorporate updated GIS data 112, amplifying data 116, and/or demographic data 118 into training data 129 and trained data models 122 for the system 108.

In some implementations, the method 700 begins with feature analytics engine 144 determining whether a trained data model 122 is up-to-date (702), which in some examples, is based on whether training data 129 for a respective trained data model 122 has been updated since the model was last trained. In one example, the feature analytics engine 144 determines whether the trained data model incorporates the most recent training data by comparing a date associated with a trained data model 122 to an update date for applicable data received from external data sources 106. Because elements of training data 129 are continuously updated as the system 108 receives updated GIS data 112, amplifying data 116, and demographic data 118 that are incorporated into property feature vectors 114, the feature analytics engine 144, in some examples, retrains and refits any data models affected by data updates, which improves the accuracy of property value calculations that are made from property feature vectors 114.

If the training data 129 has been updated since the last time the data model was trained, then in some examples, the feature analytics engine 144 compiles training data 129 for the data model (704). For example, the feature analytics engine 144, in some embodiments, compiles training data 129 for a data model from property feature vectors 114, demographic data 118, home sale data, MLS system data, and appraisal data (for example, features that appraisers have identified as having an impact on property value). In some examples, the compiled training data 129 associated with targeted features captured by the trained data model 122, such as the same geographic region (e.g., city, county, population center) or a geographic region with similar characteristics, data associated with a particular demographic group, and/or data associated with a particular type of output generated by the feature engineering system 108.

In some examples, the feature analytics engine 144 trains the data model 122 with the compiled training data 129 using supervised and/or unsupervised machine learning algorithms (706). In addition, the feature analytics engine 144 can output any property feature vector modifications that it detects based on processing the updated training data 129 (708). For example, one or more features that previously had an impact on property value may now have an insignificant effect on property value and can be removed from the property feature vectors 114 of properties associated with the trained data model 122. In some examples, over time, the dominant demographic in one neighborhood may shift from encompassing mostly young families to encompassing senior citizens such that having nearby schools with high quality ratings has less of an impact on property value. Because the training data 129 is customized to a location, demographic group, property type, and/or type of output, the trained data model 122 is better able to be used to accurately predict property values and/or determine which property features have the greatest impact on property value. If another data model is affected by data updates from external data sources 106 (708), then in some examples, the feature analytics engine 144 trains the data model with compiled training data 129 for the next data model (710).

Although illustrated in a particular series of events, in other implementations, the steps of the data model training process 700 may be performed in a different order. For example, compiling training data (704) may be performed before, after, or simultaneously with determining whether a data model is up-to-date (702). In some embodiments, based on the processing resources available to the system 108, multiple iterations of the data model training process 700 can run simultaneously to train multiple customized data models. Additionally, in other embodiments, the process may include more or fewer steps while remaining within the scope and spirit of the data model training process 700.

Figure 8:
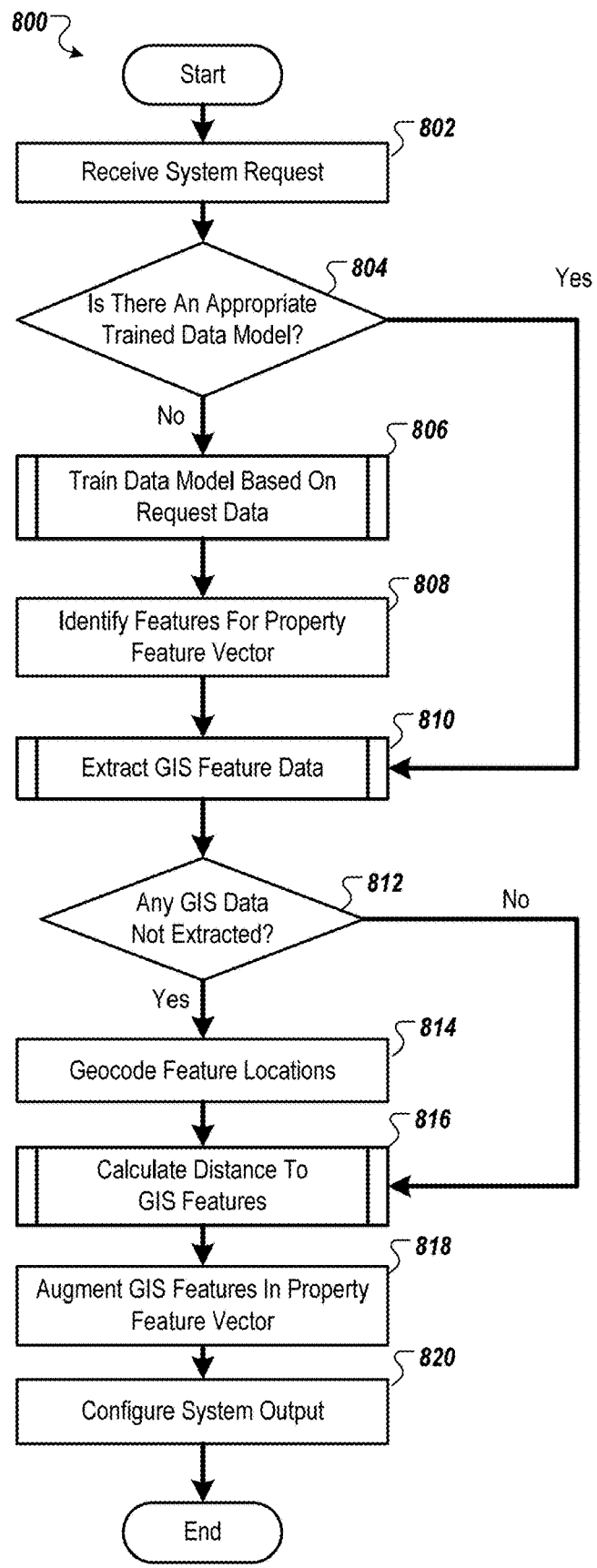
FIG. 8 is a flow chart of an example method of generating customized property feature vectors.

Turning to FIG. 8 a flow chart of an example method 800 for generating a customized property feature vector and producing any applicable outputs is illustrated. In some implementations, the method 800 is performed by a combination of data mining and collection engine 132, GIS data extraction engine 136, feature analytics engine 144, geocoding engine 138, distance calculation engine 140, feature augmentation engine 142, and output generation engine 146.

In some implementations, the method 800 commences with data mining and collection engine 132 receiving a request submitted to the feature engineering system 108 by a user 102 and/or integrated system 104 (802). In some examples, the request can be for one or more property values and may be submitted in the form of addresses, geographic coordinates (e.g., latitude/longitude) or individual properties or indications of regions of properties (e.g., zip code, city, county). In some embodiments, the request can be for identification of one or more comparable properties to a submitted property. The request may also include property value features that are important to a specific user 102 as well as specific demographic groups or types of properties that are being targeted by the integrated systems 104. In other examples, the request may be for the raw property feature vector data 114 generated by the feature engineering system 108.

If, in some implementations, there is not an appropriate trained data model 129 associated with the request (e.g., no trained model associated with the location, type of property, demographic group, etc.) (804), then in some examples, the feature analytics engine 144 compiles training data 129 and trains a data model with machine learning algorithms (see FIG. 7) (806). In some examples, the feature analytics engine 144 identifies one or more features for a property feature vector 114 associated with the request based on the user-identified property features in the request as well as features identified by a respective trained data model 129 associated with the request (808).

Figure 9:
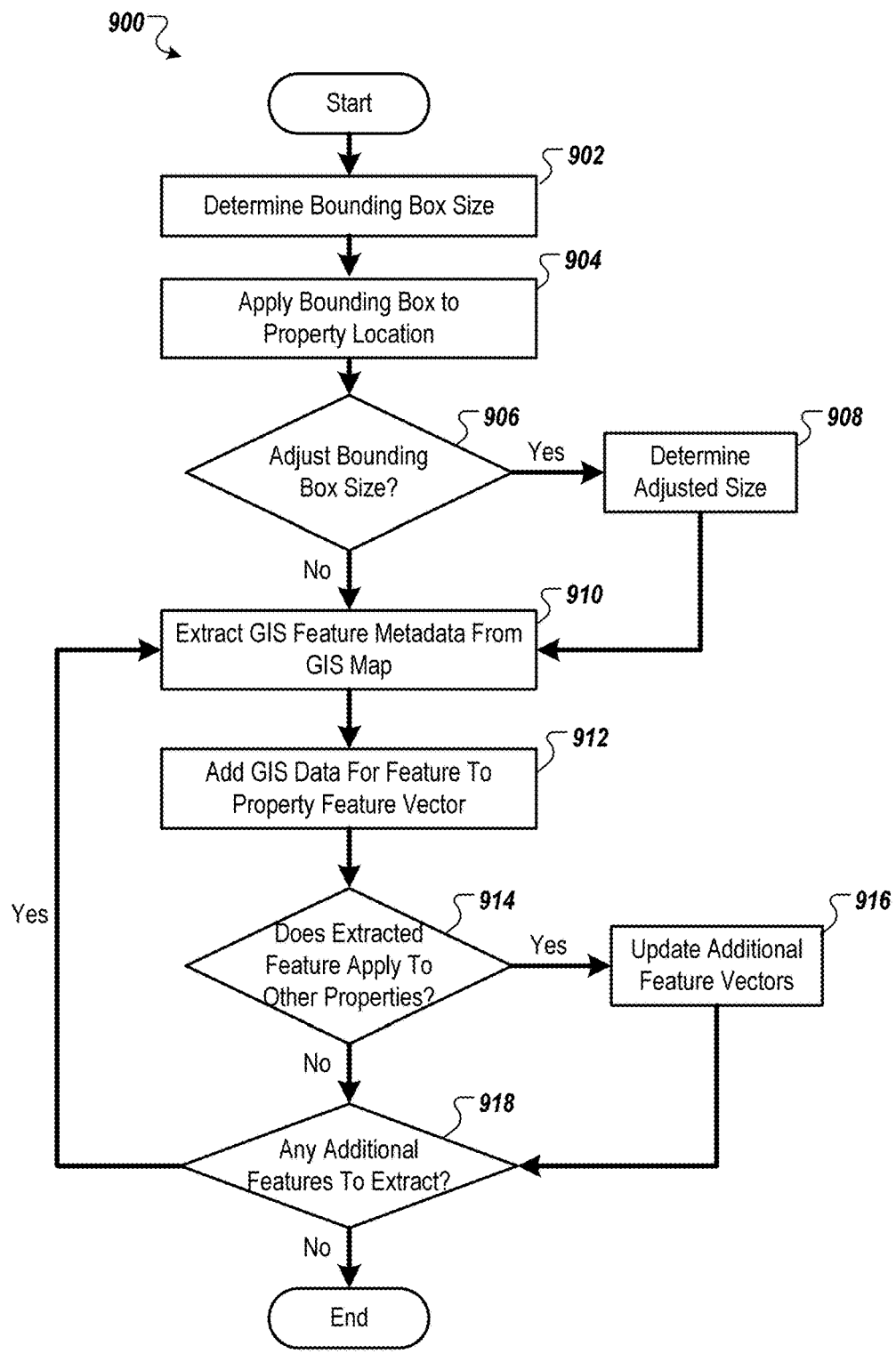
FIG. 9 is a flow chart of an example method of extracting GIS metadata from GIS data sources.

In some embodiments, based on the property features identified by feature analytics engine 144, GIS data extraction engine 136 extracts targeted GIS feature metadata from GIS maps that can have an impact on property values (810). At each property location, in some examples, the GIS data extraction engine 136 can detect features within one or a combination of maps from multiple GIS sources (e.g., OSM, ArcGIS®, Google Maps®). For example, FIG. 9 is a flow chart of an example method 900 for extracting GIS metadata from maps for property feature vectors 114. In some implementations, the method 900 is performed by GIS data extraction engine 136.

In some examples, the method 900 begins with GIS data extraction engine 136 determining a bounding box size for a property location (902) and applying the bounding box to the property location (904). For example, as shown in FIG. 2, bounding box 204 is applied to property location 202 so that the bounding box 204 is centered on the property location 202. In some embodiments, if the GIS data extraction engine 136 determines that the size of the bounding box should be adjusted based on a number of GIS features that fall within or within a predetermined distance of the bounding box (906), then in some examples, the GIS data extraction engine 136 can increase or decrease the size of the bounding box accordingly (908). For example, the GIS data extraction engine 136 may apply smaller bounding boxes to property locations in urban areas with higher densities of amenity features, transportation features, land use features, economic features, and public utility features than in rural areas.

In some implementations, the GIS data extraction engine 136 scans a geospatial map to extract a GIS feature encoded into the map that has an impact on property values (910) and in some examples adds the extracted GIS metadata to a property feature vector 114 (912). For example, FIG. 3 shows a table of extracted GIS features 300 that include a GIS identification code 302, encoded feature location coordinates 303, GIS data tags 304, and feature data type 306. If the extracted feature applies to any other properties (914), then in some implementations, the GIS data extraction engine 136 adds the extracted GIS data to property feature vectors for the other properties (916). In some embodiments, the GIS data extraction engine 136 continues populating the property feature vector 114 with GIS metadata until all of the metadata for GIS features within a predetermined distance of the property location and/or bounding box have been added to the property feature vector 114 (918).

Although illustrated in a particular series of events, in other implementations, the steps of the GIS feature extraction process 900 may be performed in a different order. For example, adding GIS data to a property feature vector of one property location (912) may be performed before, after, or simultaneously with adding the GIS data to property feature vectors for additional property locations (916). In some embodiments, based on the processing resources available to the system 108, multiple iterations of the GIS feature extraction process 900 can run simultaneously to populate multiple property feature vectors with extracted GIS metadata in parallel. Additionally, in other embodiments, the process may include more or fewer steps while remaining within the scope and spirit of GIS feature extraction process 900.

Returning to FIG. 8, in some implementations, if GIS metadata for any of the geographic features identified by feature analytics engine 144 is not included in GIS data sources (812), then in some examples, a geocoding engine 138 geocodes location data for the remaining geographic features based on information obtained from one or more external data sources 106 and updates the property feature vector 114 with the geocoded location information (814). For example, GIS map data may not include encoded metadata for economic features, such as retail businesses, restaurants, and corporations so the geocoding engine 138, in some embodiments, geocodes address information for the businesses obtained from business directory websites or websites for the individual businesses.

Figure 10:
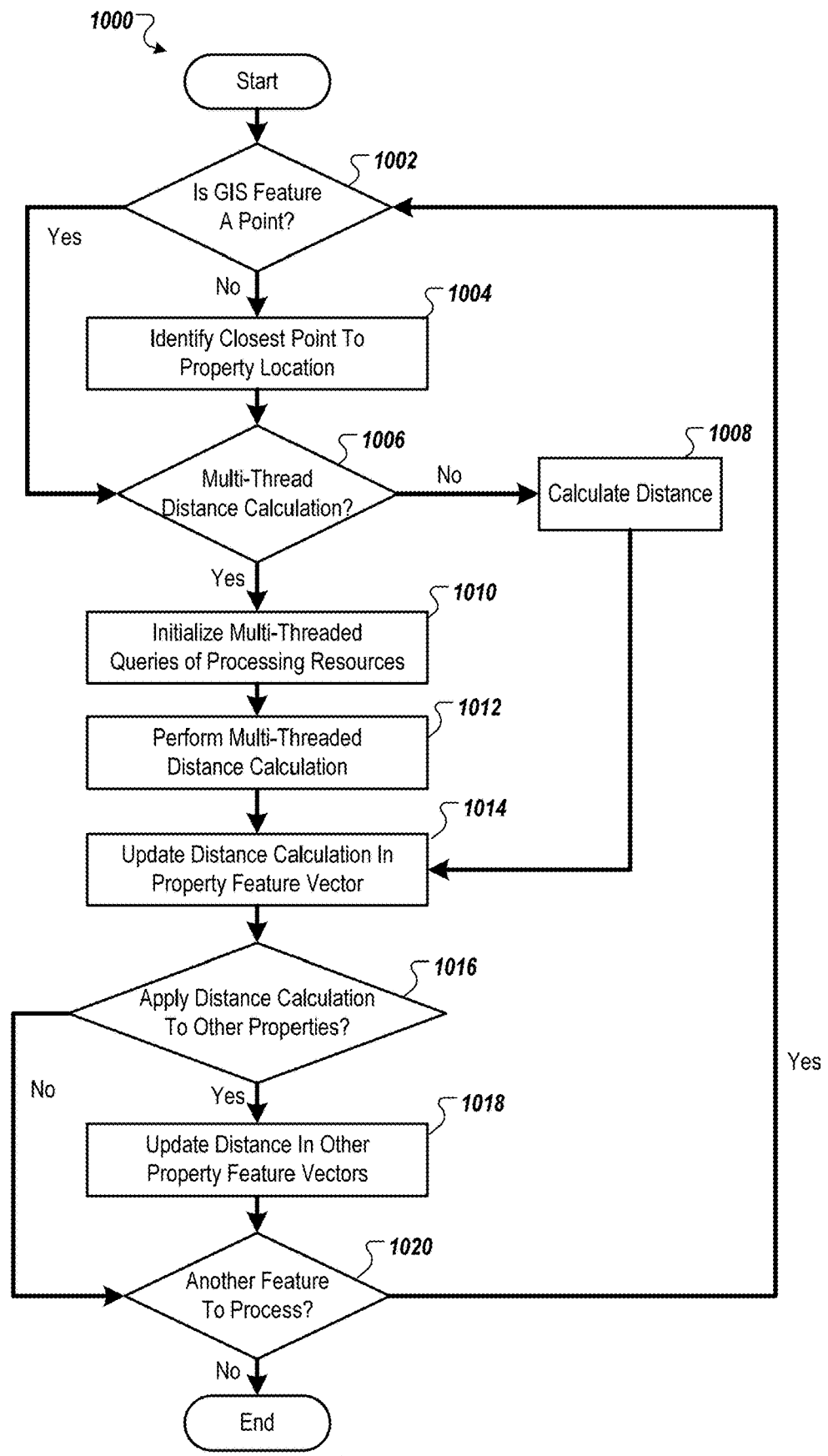
FIG. 10 is a flow chart of an example of method of calculating distances to GIS features in a property feature vector.

In some implementations, for each geocoded feature in a property feature vector 114, distance calculation engine 140 computes a distance between the property location and the respective geocoded feature data (816). For example, FIG. 10 is a flow chart of an example method 1000 for calculating distances from a property location to geocoded features. In some examples, the method 1000 is performed by distance calculation engine 140.

In some implementations, the method 1000 begins with determining a data type for a GIS feature in a property feature vector (1002). If the GIS data type is not a point (e.g., the feature is a line or a polygon made up of multiple points), then in some examples, distance calculation engine 140 identifies a closest point in the line or polygon to the property location or to a bounding box surrounding the property location (1004). For example, the table of extracted feature vectors 300 shown in FIG. 3 includes a column 310 for the closest point to the respective property location for line and polygon data types.

In some embodiments, the distance calculation engine 140 may determine that a distance calculation from the property location to the GIS feature should be multi-threaded based on a processing complexity of the distance calculation (1006). In some examples, for distance calculations with a computational complexity below a predetermined threshold, the distance calculation engine 140 may calculate the distance without performing any multi-threading processing operations (1008). If the computational complexity of the distance calculation is greater than a predetermined threshold, then in some implementations, the distance calculation engine 140 may initialize multi-threaded queries of the available processing resources to perform the distance calculation (1010). For example, powerline GIS features may be encoded into hundreds or thousands of subsegments over an area of 5 square miles, which increases the computational complexity of calculating a property's shortest distance to GIS powerline subsegments within a predetermined distance. By multi-threading powerline distance calculation queries to processing resources of the feature engineering system 108, the distance calculation engine 140 can calculate distance to extracted GIS features in real-time or near-real time (1012). In some implementations, the distance calculation engine 140 updates the property feature vector 114 with the calculated distance to the GIS feature (1014).

In some implementations, if there are other properties within the vicinity of the property location that are similarly situated with respect to a GIS feature (1016), the distance calculation engine 140, in some examples, may update the feature vectors for the other properties with the calculated distance by applying an adjustment factor to account for small differences in distance (1018). For example, the distance calculation engine 140 can perform one distance calculation from a first property to a sub-section of powerline and then just apply the distance calculation to other properties in the vicinity with an adjustment factor without having to perform powerline distance calculation for each of the properties. In some embodiments, the distance calculation engine 140 continues calculating distances between the property location and the extracted GIS features until all distances to all of the GIS features in the property feature vector 114 have been calculated (1020).

Although illustrated in a particular series of events, in other implementations, the steps of the GIS feature distance calculation process 1000 may be performed in a different order. For example, calculating a distance to a GIS feature (1008, 1010) may be performed before, after, or simultaneously with determining whether the distance calculation can be applied to other properties within the vicinity of the property location (1016). In some embodiments, based on the processing resources available to the system 108, multiple iterations of the GIS feature distance calculation process 1000 can run simultaneously to populate multiple property feature vectors 114 with extracted GIS metadata in parallel. Additionally, in other embodiments, the process may include more or fewer steps while remaining within the scope and spirit of GIS feature distance calculation process 1000.

Returning to FIG. 8, in some embodiments, feature augmentation engine 142 augments each GIS feature in a property feature vector 114 with amplifying data 116 which expands the scope of a property feature vector 114 and gives a broader, more robust picture of how GIS features affect property value than including only the distances from the property location to GIS features (818). In some implementations, the feature augmentation engine 142 uses the information in GIS metadata to identify relevant amplifying information 116 to add to the property feature vector 114. For example, the feature augmentation engine 142 can match a feature name, data tags, and or geocoded location from GIS feature data to amplifying data 116 stored in the data repository 110 and/or trigger data mining and collection engine 132 to obtain the amplifying data 116 from external data sources 106. In some implementations, the feature augmentation engine 142 can also group combinations of GIS features that together have a correlative effect on property values. For example, having multiple grocery stores within a predetermined distance of a property location may have an impact on property value, so in some examples, the feature augmentation engine 142 can produce an additional GIS feature that includes data for each of the grocery stores within the vicinity of the property location.

In some implementations, output generation engine 146 generates system outputs in response to queries received from users 102 and/or integrated systems 104 (820). For example, using the trained data models 122, output generation engine 146 can be configured to determine property values, perform collateral evaluations, identify comparable properties, and identify properties to market to different demographic groups based on the customized property feature vectors. In other examples, the output generation engine 146 can be configured to output a customized property feature vector directly to a user 102 and/or integrated system 104.

Although illustrated in a particular series of events, in other implementations, the steps of the customized property feature vector generation process 800 may be performed in a different order. For example, extracting GIS feature data (810) may be performed before, after, or simultaneously with geocoding additional geographic features (814). In some embodiments, based on the processing resources available to the system 108, multiple iterations of the customized property feature vector generation process 800 can run simultaneously to generate multiple property feature vectors in parallel. Additionally, in other embodiments, the process may include more or fewer steps while remaining within the scope and spirit of the customized property feature vector generation process 800.

Figure 11:
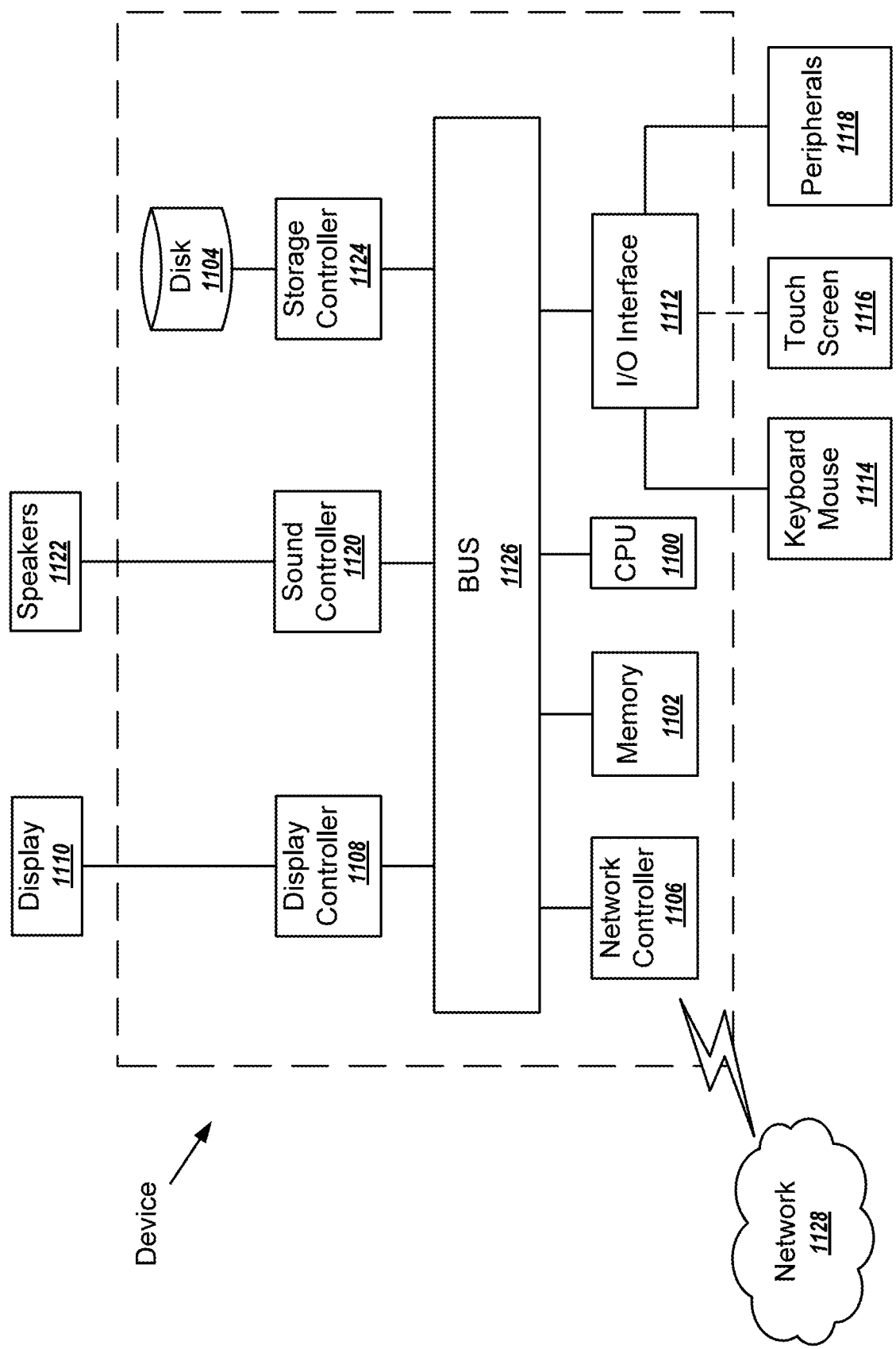
FIG. 11 is a block diagram of an example computing system.

Next, a hardware description of a computing device, mobile computing device, computing system, or server according to exemplary embodiments is described with reference to FIG. 11. The computing device, for example, may represent the users 102, integrated systems 104, external data sources 106, or one or more computing systems supporting the functionality of the feature engineering system 108, as illustrated in FIG. 1. In FIG. 11, the computing device, mobile computing device, or server includes a CPU 1100 which performs the processes described above. The process data and instructions may be stored in memory 1102. The processing circuitry and stored instructions may enable the computing device to perform, in some examples, the methods 700, 800, 900, and 1000 of FIGS. 7-10. These processes and instructions may also be stored on a storage medium disk 1104 such as a hard drive (HDD) or portable storage medium or may be stored remotely. Further, the claimed advancements are not limited by the form of the computer-readable media on which the instructions of the inventive process are stored. For example, the instructions may be stored on CDs, DVDs, in FLASH memory, RAM, ROM, PROM, EPROM, EEPROM, hard disk or any other information processing device with which the computing device, mobile computing device, or server communicates, such as a server or computer. The storage medium disk 1104, in some examples, may store the contents of the data repository 110 of FIG. 1, as well as the data maintained by the users 102, integrated systems 104, and external data sources 106 prior to accessing by the feature engineering system 108 and transferring to the data repository 110.

Further, a portion of the claimed advancements may be provided as a utility application, background daemon, or component of an operating system, or combination thereof, executing in conjunction with CPU 1100 and an operating system such as Microsoft Windows 9, UNIX, Solaris, LINUX, Apple MAC-OS and other systems known to those skilled in the art.

CPU 1100 may be a Xenon or Core processor from Intel of America or an Opteron processor from AMD of America, or may be other processor types that would be recognized by one of ordinary skill in the art. Alternatively, the CPU 1100 may be implemented on an FPGA, ASIC, PLD or using discrete logic circuits, as one of ordinary skill in the art would recognize. Further, CPU 1100 may be implemented as multiple processors cooperatively working in parallel to perform the instructions of the inventive processes described above.

The computing device, mobile computing device, or server in FIG. 11 also includes a network controller 1106, such as an Intel Ethernet PRO network interface card from Intel Corporation of America, for interfacing with network 1128. As can be appreciated, the network 1128 can be a public network, such as the Internet, or a private network such as an LAN or WAN network, or any combination thereof and can also include PSTN or ISDN sub-networks. The network 1128 can also be wired, such as an Ethernet network, or can be wireless such as a cellular network including EDGE, 3G, 4G, and 5G wireless cellular systems. The wireless network can also be Wi-Fi, Bluetooth, or any other wireless form of communication that is known. The network 1128, for example, may support communications between the feature engineering system 108 and any one of the users 102, integrated systems 104, or external data sources 106.

The computing device, mobile computing device, or server further includes a display controller 1108, such as a NVIDIA GeForce GTX or Quadro graphics adaptor from NVIDIA Corporation of America for interfacing with display 1110, such as a Hewlett Packard HPL2445w LCD monitor. A general purpose I/O interface 1112 interfaces with a keyboard and/or mouse 1114 as well as a touch screen panel 1116 on or separate from display 1110. General purpose I/O interface 1112 also connects to a variety of peripherals 1118 including printers and scanners, such as an OfficeJet or DeskJet from Hewlett Packard. The display controller 1108 and display 1110 may enable presentation of user interfaces for submitting requests to the feature engineering system 108.

A sound controller 1120 is also provided in the computing device, mobile computing device, or server, such as Sound Blaster X-Fi Titanium from Creative, to interface with speakers/microphone 1122 thereby providing sounds and/or music.

The general purpose storage controller 1124 connects the storage medium disk 1104 with communication bus 1126, which may be an ISA, EISA, VESA, PCI, or similar, for interconnecting all of the components of the computing device, mobile computing device, or server. A description of the general features and functionality of the display 1110, keyboard and/or mouse 1114, as well as the display controller 1108, storage controller 1124, network controller 1106, sound controller 1120, and general purpose I/O interface 1112 is omitted herein for brevity as these features are known.

One or more processors can be utilized to implement various functions and/or algorithms described herein, unless explicitly stated otherwise. Additionally, any functions and/or algorithms described herein, unless explicitly stated otherwise, can be performed upon one or more virtual processors, for example on one or more physical computing systems such as a computer farm or a cloud drive.

Reference has been made to flowchart illustrations and block diagrams of methods, systems and computer program products according to implementations of this disclosure. Aspects thereof are implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable medium that can direct a computer or other programmable data processing apparatus to function in a particular manner, such that the instructions stored in the computer-readable medium produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide processes for implementing the functions/acts specified in the flowchart and/or block diagram block or blocks.

Moreover, the present disclosure is not limited to the specific circuit elements described herein, nor is the present disclosure limited to the specific sizing and classification of these elements. For example, the skilled artisan will appreciate that the circuitry described herein may be adapted based on changes on battery sizing and chemistry or based on the requirements of the intended back-up load to be powered.

Figure 12:
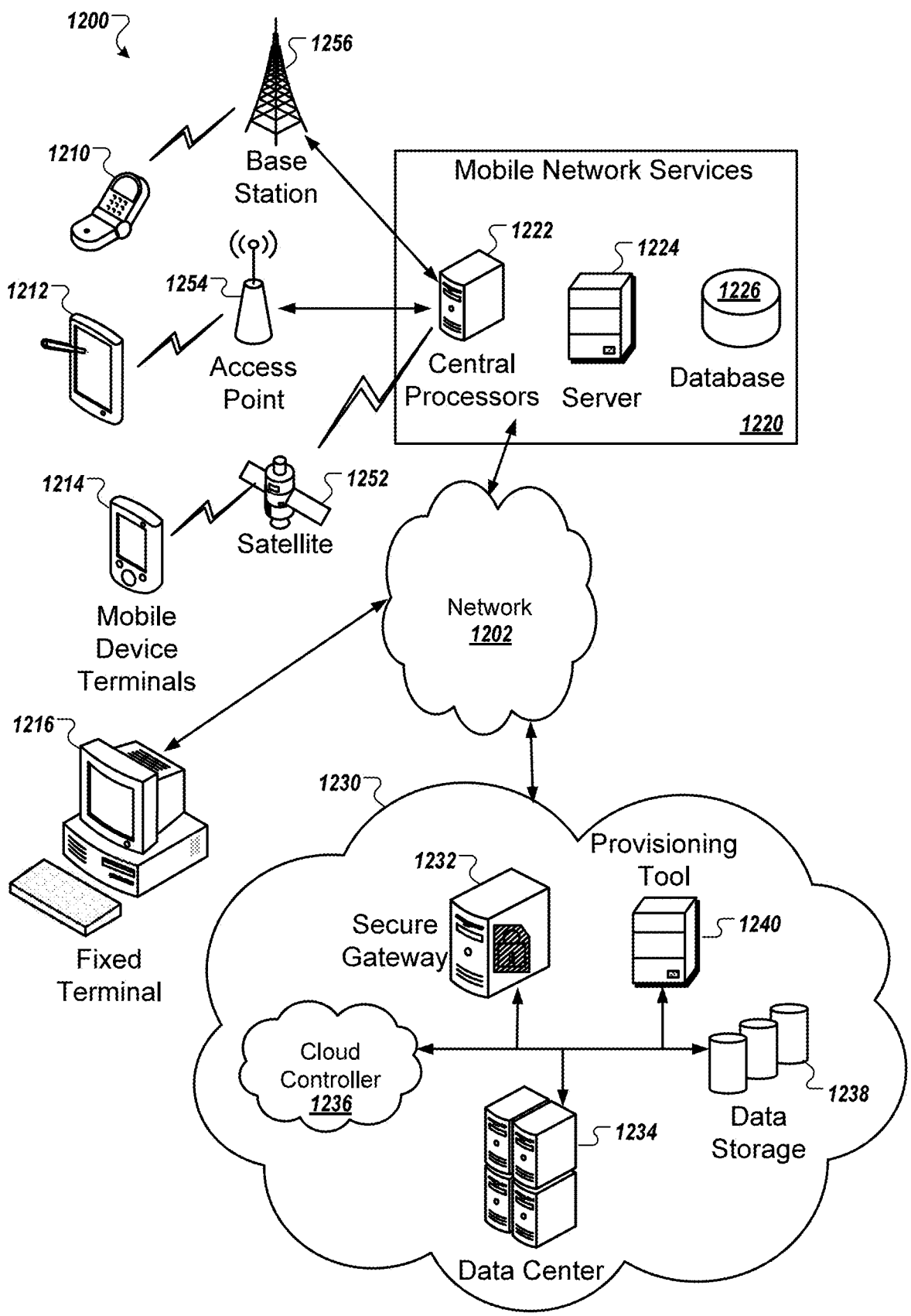
FIG. 12 is a block diagram of an example distributing computing environment including a cloud computing environment.

The functions and features described herein may also be executed by various distributed components of a system. For example, one or more processors may execute these system functions, wherein the processors are distributed across multiple components communicating in a network. The distributed components may include one or more client and server machines, which may share processing, as shown on FIG. 12, in addition to various human interface and communication devices (e.g., display monitors, smart phones, tablets, personal digital assistants (PDAs)). The network may be a private network, such as a LAN or WAN, or may be a public network, such as the Internet. Input to the system may be received via direct user input and received remotely either in real-time or as a batch process. Additionally, some implementations may be performed on modules or hardware not identical to those described. Accordingly, other implementations are within the scope that may be claimed.

In some implementations, the described herein may interface with a cloud computing environment 1230, such as Google Cloud Platform™ to perform at least portions of methods or algorithms detailed above. The processes associated with the methods described herein can be executed on a computation processor, such as the Google Compute Engine by data center 1234. The data center 1234, for example, can also include an application processor, such as the Google App Engine, that can be used as the interface with the systems described herein to receive data and output corresponding information. The cloud computing environment 1230 may also include one or more databases 1238 or other data storage, such as cloud storage and a query database. In some implementations, the cloud storage database 1238, such as the Google Cloud Storage, may store processed and unprocessed data supplied by systems described herein. For example, request data 111, GIS data 112, property feature vectors 114, amplifying data 116, demographic data 118, feature data 120, trained data models 122, distance data 124, geocoded data 126, output data 128, and training data 129 may be maintained by the feature engineering system 108 of FIG. 1 in a database structure such as the databases 1238.

The systems described herein may communicate with the cloud computing environment 1230 through a secure gateway 1232. In some implementations, the secure gateway 1232 includes a database querying interface, such as the Google BigQuery platform. The data querying interface, for example, may support access by the feature engineering system 108 to data stored on any one of the users 102 and integrated systems 104.

The cloud computing environment 1230 may include a provisioning tool 1240 for resource management. The provisioning tool 1240 may be connected to the computing devices of a data center 1234 to facilitate the provision of computing resources of the data center 1234. The provisioning tool 1240 may receive a request for a computing resource via the secure gateway 1232 or a cloud controller 1236. The provisioning tool 1240 may facilitate a connection to a particular computing device of the data center 1234.

A network 1202 represents one or more networks, such as the Internet, connecting the cloud environment 1230 to a number of client devices such as, in some examples, a cellular telephone 1210, a tablet computer 1212, a mobile computing device 1214, and a desktop computing device 1216. The network 1202 can also communicate via wireless networks using a variety of mobile network services 1220 such as Wi-Fi, Bluetooth, cellular networks including EDGE, 3G, 4G, and 5G wireless cellular systems, or any other wireless form of communication that is known. In some examples, the wireless network services 1220 may include central processors 1222, servers 1224, and databases 1226. In some embodiments, the network 1202 is agnostic to local interfaces and networks associated with the client devices to allow for integration of the local interfaces and networks configured to perform the processes described herein. Additionally, external devices such as the cellular telephone 1210, tablet computer 1212, and mobile computing device 1214 may communicate with the mobile network services 1220 via a base station 1256, access point 1254, and/or satellite 1252.

While certain embodiments have been described, these embodiments have been presented by way of example only and are not intended to limit the scope of the present disclosures. Indeed, the novel methods, apparatuses and systems described herein can be embodied in a variety of other forms; furthermore, various omissions, substitutions and changes in the form of the methods, apparatuses and systems described herein can be made without departing from the spirit of the present disclosures. The accompanying claims and their equivalents are intended to cover such forms or modifications as would fall within the scope and spirit of the present disclosures.

What is claimed is:

1. A method comprising:
    by processing circuitry, for each respective real estate property of a plurality of real estate properties,
        a) identifying at least one geospatial feature of a plurality of geospatial features located within a predetermined distance of a location of the respective real estate property,
        b) calculating, for each respective geospatial feature of the at least one geospatial feature, a distance between the location of the respective real estate property and the respective geospatial feature, and
        c) storing, to a non-transitory storage region, a feature vector for the respective real estate property, the feature vector comprising
            property features comprising at least a subset of a plurality of property attributes, and
            the at least one geospatial feature including, for each respective geospatial feature of the at least one geospatial feature, the distance,
    wherein the storing results in a plurality of feature vectors being stored to the non-transitory storage region;
    by the processing circuitry, for each respective subset of a plurality of subsets of the plurality of real estate properties, evaluating, using one or more machine learning algorithms, a respective portion of the plurality of feature vectors corresponding to the subset of real estate properties to identify a respective set of impactful features identified as having a significant impact on property value for the respective subset of real estate properties, wherein
        the respective subset of real estate properties share at least one of a property type, a target geographic region, a target demographic group, or a same geospatial feature of the plurality of geospatial features;
    training, by the processing circuitry, a plurality of machine learning data models, wherein
        each trained data model of the plurality of machine learning data models is configured to, using a respective portion of the plurality of geospatial features and a respective portion of the plurality of property attributes corresponding to a given set of impactful features, apply machine learning to the feature vectors of at least a portion of the plurality of real estate properties to identify one or more of a) a set of similar real estate properties determined to be similar based at least in part on the given set of impactful features or b) a property valuation for each real estate property of one or more real estate properties determined to be similar based at least in part on the given set of impactful features; and
    by the processing circuitry, responsive a request submitted by a remote computing device,
        i) identifying a set of feature data for the request, the set of feature data comprising
            one or more geospatial features, and
            at least one property attribute of the plurality of property attributes,
        ii) selecting a trained data model of the plurality of machine learning data models,
        iii) obtaining, responsive to the trained data model applying the set of feature data, result information, and
        iv) providing, to the remote computing device, the result information.

2. The method of claim 1, further comprising receiving, via an application programming interface (API), the request.

3. The method of claim 1, wherein identifying the at least one geospatial feature comprises extracting, from a geospatial information system (GIS) map file, metadata for at least a portion of the plurality of geospatial features.

4. The method of claim 1, further comprising, for each respective real estate property of at least a portion of the plurality of real estate properties:
    augmenting, by the processing circuitry, each geospatial feature in the feature vector of the respective real estate property with amplifying data characterizing the respective geospatial feature, wherein
        the amplifying data is extracted from one or more external data sources.

5. The method of claim 4, wherein:
    a given geospatial feature of the one or more geospatial features comprises a body of water; and
    the amplifying data comprises at least one of a waterfront view identifier, an impediment to water view identifier, or a water access identifier.

6. The method of claim 1, wherein:
    the set of similar real estate properties is a set of comparable properties to a subject property; and
    identifying the set of feature data comprises extracting at least a portion of the set of feature data from a subject real estate property.

7. The method of claim 1, wherein identifying the set of feature data comprises identifying, based at least in part on one or more of i) the target demographic group or ii) the target geographic region, the set of feature data.

8. The method of claim 1, wherein selecting the trained data model comprises identifying, based at least in part on the target demographic group, the trained data model.

9. The method of claim 1, wherein evaluating the portion of the plurality of feature vectors comprises determining, for each respective feature of the set of impactful features, a corresponding weighting factor indicative of a relative impact of the respective feature on property value.

10. The method of claim 1, wherein at least a portion of the plurality of machine learning data models is trained using appraisal data for each property of a plurality of training properties.

11. A system comprising:
    a non-transitory storage region configured to store a plurality of feature vectors, each feature vector of the plurality of feature vectors corresponding to a respective property of a plurality of real estate properties;

a plurality of trained data models, each data model of the plurality of trained data models configured to accept at least a respective portion of a plurality of geospatial features and at least a respective portion of a plurality of property attributes, wherein
each trained data model of the plurality of trained data models is configured to, using the respective portion of the plurality of geospatial features and the respective portion of the plurality of property attributes, apply machine learning to the feature vectors of at least a portion of the plurality of real estate properties to identify one or more of a) a set of similar real estate properties or b) a property valuation for each real estate property of one or more real estate properties;
a non-transitory computer-readable media storing a plurality of machine-executable instructions; and
processing circuitry, wherein the plurality of machine-executable instructions, when executed by the processing circuitry, cause the processing circuitry to
for each respective real estate property of the plurality of real estate properties,
a) identify at least one geospatial feature of the plurality of geospatial features located within a predetermined distance of a location of the respective real estate property,
b) calculate, for each respective geospatial feature of the at least one geospatial feature, a distance between the location of the respective real estate property and the respective geospatial feature, and
c) store, to the non-transitory storage region, a feature vector for the respective real estate property, the feature vector comprising
property features comprising at least a subset of a plurality of property attributes, and
the at least one geospatial feature including, for each respective geospatial feature of the at least one geospatial feature, the distance,
for each respective subset of a plurality of subsets of the plurality of real estate properties, evaluate, using one or more machine learning algorithms, a respective portion of the plurality of feature vectors corresponding to the subset of real estate properties to identify a respective set of impactful features identified as having a significant impact on property value for the respective subset of real estate properties, wherein the respective subset of real estate properties share at least one of a property type, a target geographic region, a target demographic group, or a same geospatial feature of the plurality of geospatial features, and
responsive a request submitted by a remote computing device,
i) identify a set of feature data for the request, the set of feature data comprising
one or more geospatial features, and
at least one property attribute of the plurality of property attributes,
ii) select a trained data model of the plurality of trained data models,
iii) obtain, responsive to the trained data model applying the set of feature data, result information, and
iv) provide, to the remote computing device, the result information.

12. The system of claim 11, wherein the plurality of machine-executable instructions, when executed by the processing circuitry, cause the processing circuitry to further receive, via an application programming interface (API), the request.

13. The system of claim 11, wherein identifying the at least one geospatial feature comprises extracting, from a geospatial information system (GIS) map file, metadata for at least a portion of the plurality of geospatial features.

14. The system of claim 11, wherein the plurality of machine-executable instructions, when executed by the processing circuitry, cause the processing circuitry to, for each respective real estate property of at least a portion of the plurality of real estate properties:
augment each geospatial feature in the feature vector of the respective real estate property with amplifying data characterizing the respective geospatial feature, wherein
the amplifying data is extracted from one or more external data sources.

15. The system of claim 14, wherein:
a given geospatial feature of the one or more geospatial features comprises a body of water; and
the amplifying data comprises at least one of a waterfront view identifier, an impediment to water view identifier, or a water access identifier.

16. The system of claim 11, wherein:
the set of similar real estate properties is a set of comparable properties to a subject property; and
identifying the set of feature data comprises extracting at least a portion of the set of feature data from a subject real estate property.

17. The system of claim 11, wherein identifying the set of feature data comprises identifying, based at least in part on one or more of i) the target demographic group or ii) the target geographic region, the set of feature data.

18. The system of claim 11, wherein selecting the trained data model comprises identifying, based at least in part on the target demographic group, the trained data model.

19. The system of claim 11, wherein evaluating the portion of the plurality of feature vectors comprises determining, for each respective feature of the set of impactful features, a corresponding weighting factor indicative of a relative impact of the respective feature on property value.

20. The system of claim 11, wherein at least a portion of the plurality of trained data models is trained using appraisal data for each property of a plurality of training properties.

* * * * *